US011900891B2

(12) United States Patent
Furukawa et al.

(10) Patent No.: US 11,900,891 B2
(45) Date of Patent: *Feb. 13, 2024

(54) BACKLIGHT SYSTEM, DISPLAY APPARATUS, AND LIGHT EMISSION CONTROL METHOD

(71) Applicant: Sony Group Corporation, Tokyo (JP)

(72) Inventors: Norimasa Furukawa, Tokyo (JP); Shingo Kimura, Tokyo (JP); Kazuhiro Horiuchi, Tokyo (JP); Kenichi Nakaki, Tokyo (JP)

(73) Assignee: Sony Group Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/573,105

(22) Filed: Jan. 11, 2022

(65) Prior Publication Data

US 2022/0148529 A1 May 12, 2022

Related U.S. Application Data

(63) Continuation of application No. 16/098,936, filed as application No. PCT/JP2017/007126 on Feb. 24, 2017, now Pat. No. 11,276,356.

(30) Foreign Application Priority Data

May 31, 2016 (JP) ................................ 2016-109175

(51) Int. Cl.
*G09G 3/34* (2006.01)
*G09G 3/36* (2006.01)

(52) U.S. Cl.
CPC ......... *G09G 3/3426* (2013.01); *G09G 3/3674* (2013.01); *G09G 3/342* (2013.01);
(Continued)

(58) Field of Classification Search
CPC ............... G09G 3/3426; G09G 3/3674; G09G 2310/0237; G09G 2310/024;
(Continued)

(56) References Cited

U.S. PATENT DOCUMENTS 5,513,025 A * 4/1996 Watanabe .......... G02B 27/4244 359/569
2001/0052891 A1* 12/2001 Yoshihara .............. G09G 3/342 345/102

(Continued)

FOREIGN PATENT DOCUMENTS

JP 2004206044 A 7/2004
JP 2010191188 A 9/2010

(Continued)

OTHER PUBLICATIONS

Campbell, F.W., and Robson, J.G., "Application of Fourier Analysis to the Visibility of Gratings," Journal of Physiology, vol. 197, pp. 551-566, 1968.

(Continued)

*Primary Examiner* — Patrick N Edouard
*Assistant Examiner* — Eboni N Giles
(74) *Attorney, Agent, or Firm* — Lerner David LLP

(57) ABSTRACT

A backlight unit of the present disclosure includes: a backlight including a plurality of light-emitting devices that are allowed to emit light at mutually different timings and include a first light-emitting device and a second light-emitting device; and a controller that controls a light emission operation of the backlight to cause the first light-emitting device and the second light-emitting device to emit light with mutually different average light emission intensities in a first sub-frame period of a plurality of sub-frame periods provided corresponding to a frame period.

12 Claims, 18 Drawing Sheets

(52) U.S. Cl.
CPC ................. *G09G 2310/024* (2013.01); *G09G 2310/0237* (2013.01); *G09G 2320/0233* (2013.01); *G09G 2320/0257* (2013.01); *G09G 2320/064* (2013.01); *G09G 2320/0633* (2013.01); *G09G 2320/0646* (2013.01); *G09G 2340/0435* (2013.01)

(58) Field of Classification Search
CPC ... G09G 2320/0233; G09G 2320/0257; G09G 2320/0633; G09G 2320/064; G09G 2320/0646; G09G 2340/0435
See application file for complete search history.

(56) References Cited

U.S. PATENT DOCUMENTS

| | | | | |
|---|---|---|---|---|
| 2004/0114396 | A1* | 6/2004 | Kobayashi | G09G 3/3648 362/555 |
| 2007/0085942 | A1* | 4/2007 | Guo | G02F 1/133611 349/61 |
| 2008/0129680 | A1 | 6/2008 | Kimura et al. | |
| 2011/0084987 | A1 | 4/2011 | Kim et al. | |
| 2012/0013652 | A1* | 1/2012 | Onishi | G09G 3/3426 345/690 |
| 2012/0249617 | A1 | 10/2012 | Ikawa | |
| 2013/0314641 | A1 | 11/2013 | Okuda et al. | |

FOREIGN PATENT DOCUMENTS

| | | | |
|---|---|---|---|
| JP | 2011033801 | A | 2/2011 |
| JP | 2013029563 | A | 2/2013 |
| JP | 2013246277 | A | 12/2013 |
| JP | 2014021451 | A | 2/2014 |
| JP | 2015079174 | A | 4/2015 |

OTHER PUBLICATIONS

International Search Report from PCT/JP2017/007126, dated May 30, 2017, 3 pgs.

Japanese Office Action for Application No. 2018520363 dated Jul. 30, 2020, 3 pages.

* cited by examiner

[FIG. 1]
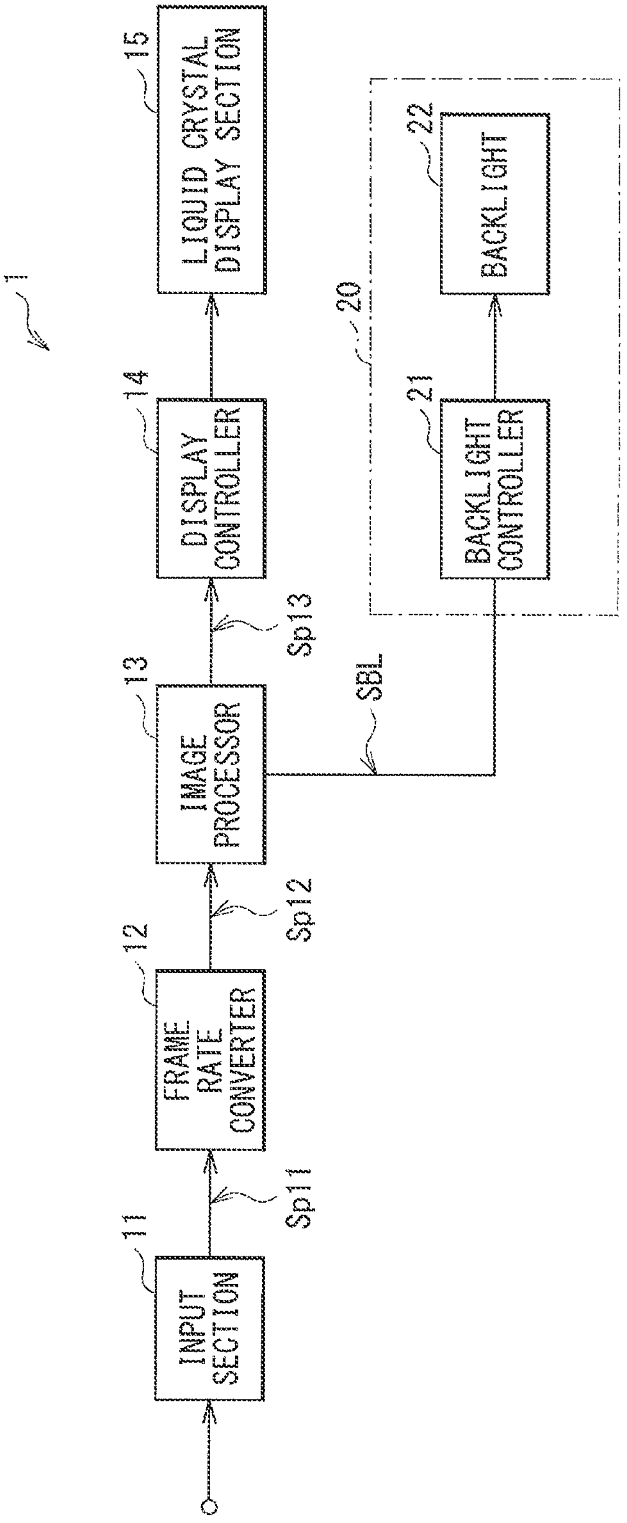

[ FIG. 2A ]
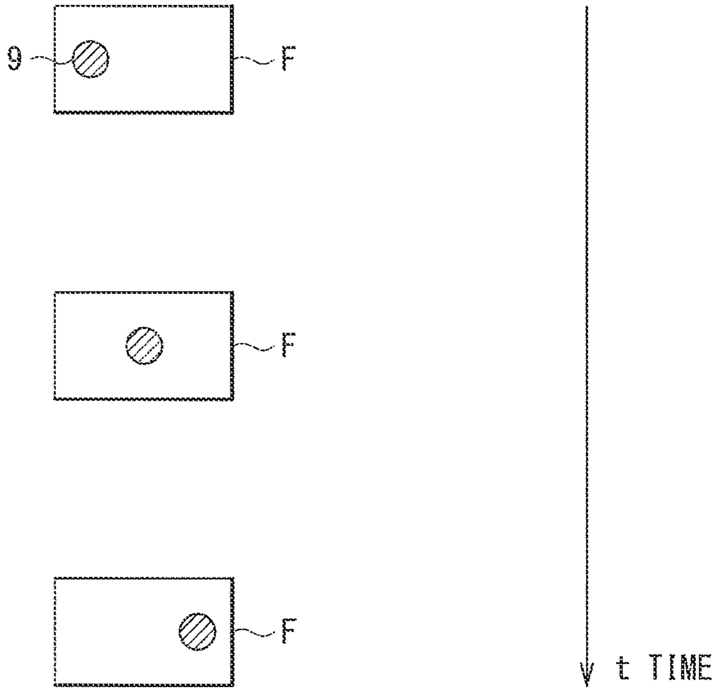
[ FIG. 2B ]
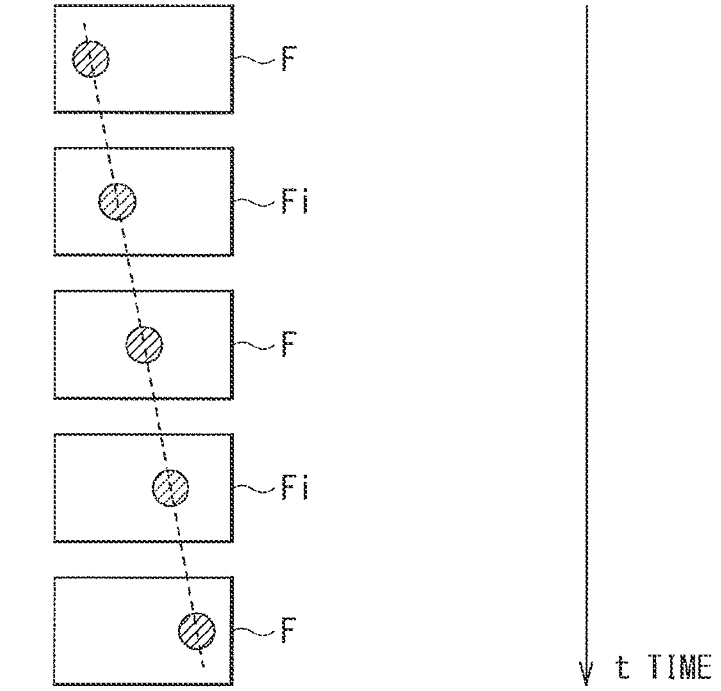

[ FIG. 3 ]
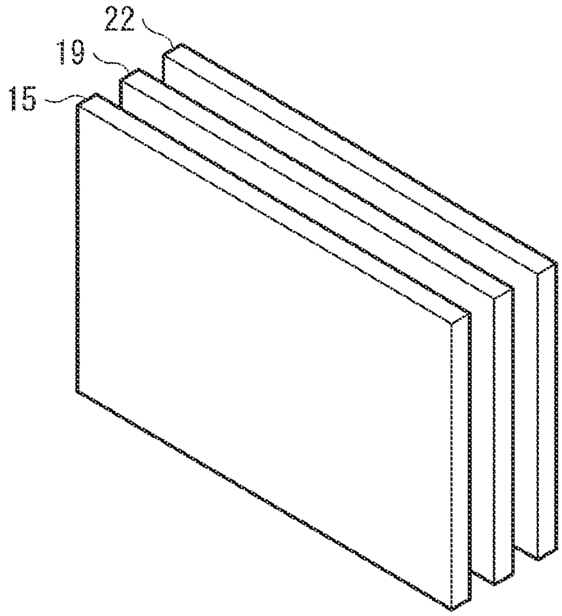
[ FIG. 4A ]
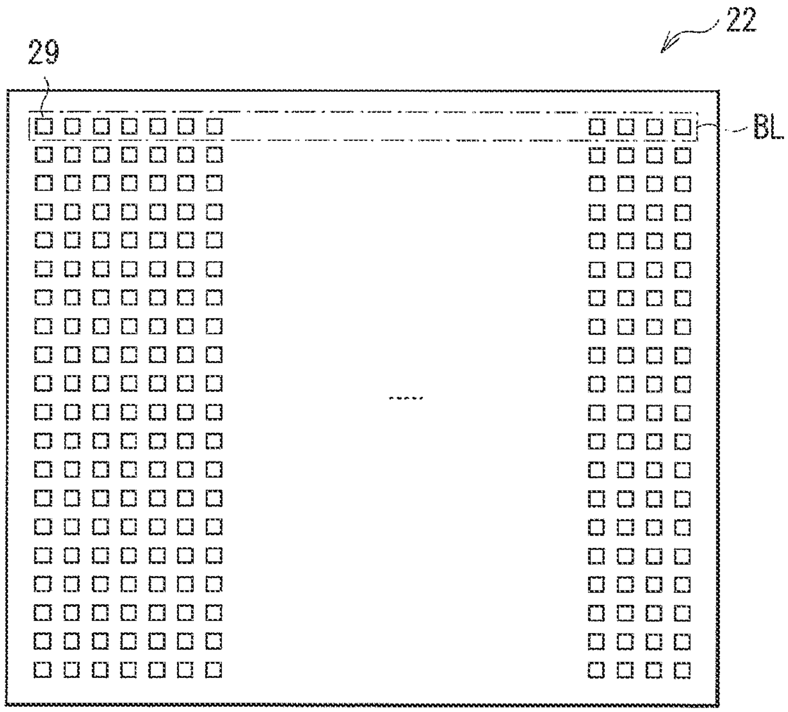

[ FIG. 4B ]
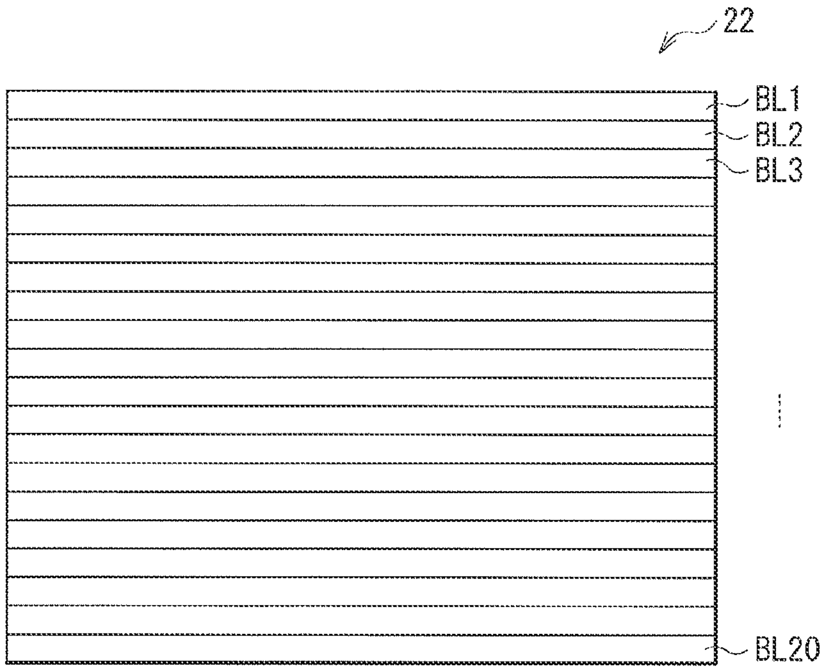

[FIG. 5]
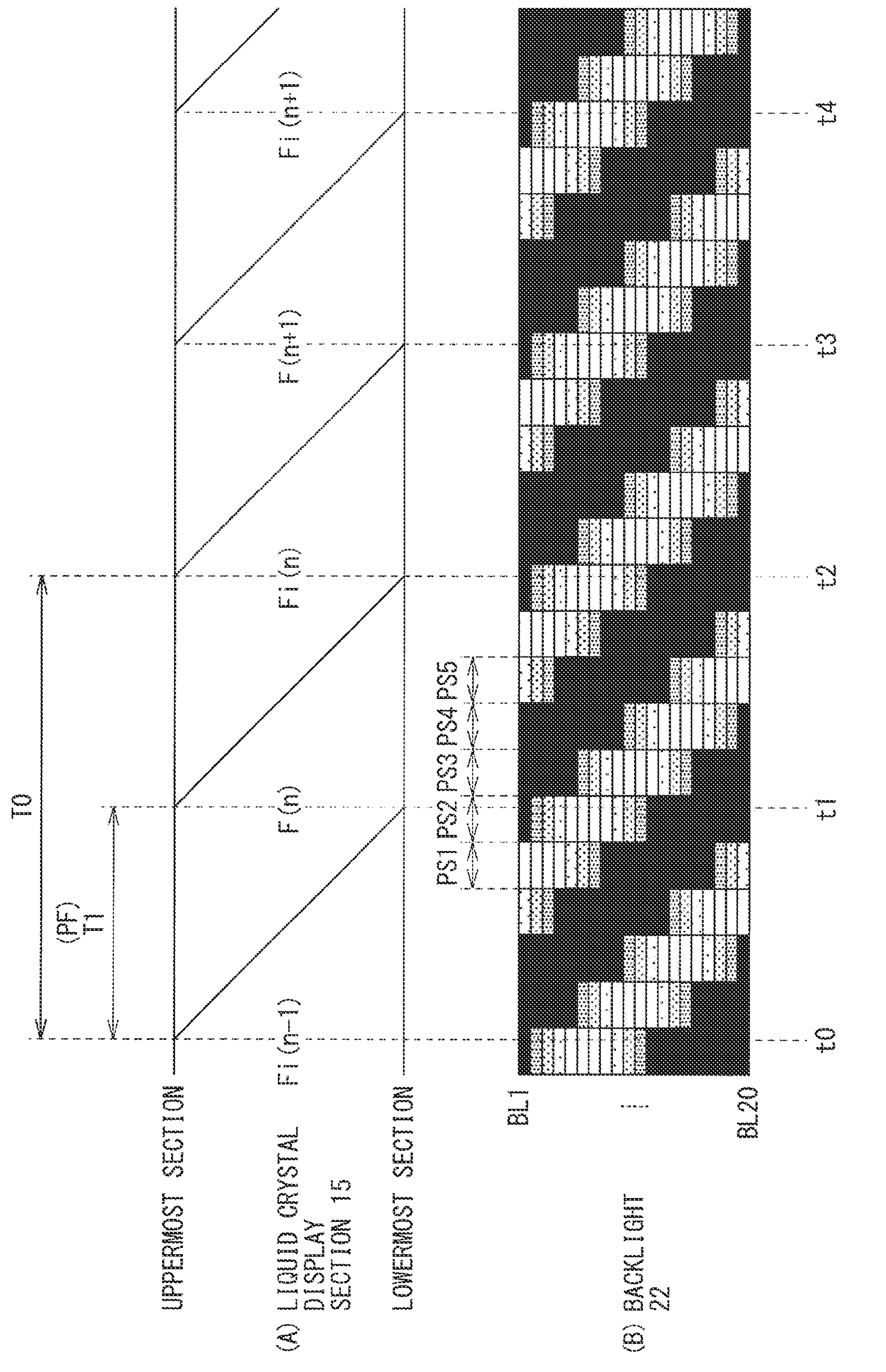

[ FIG. 6 ]
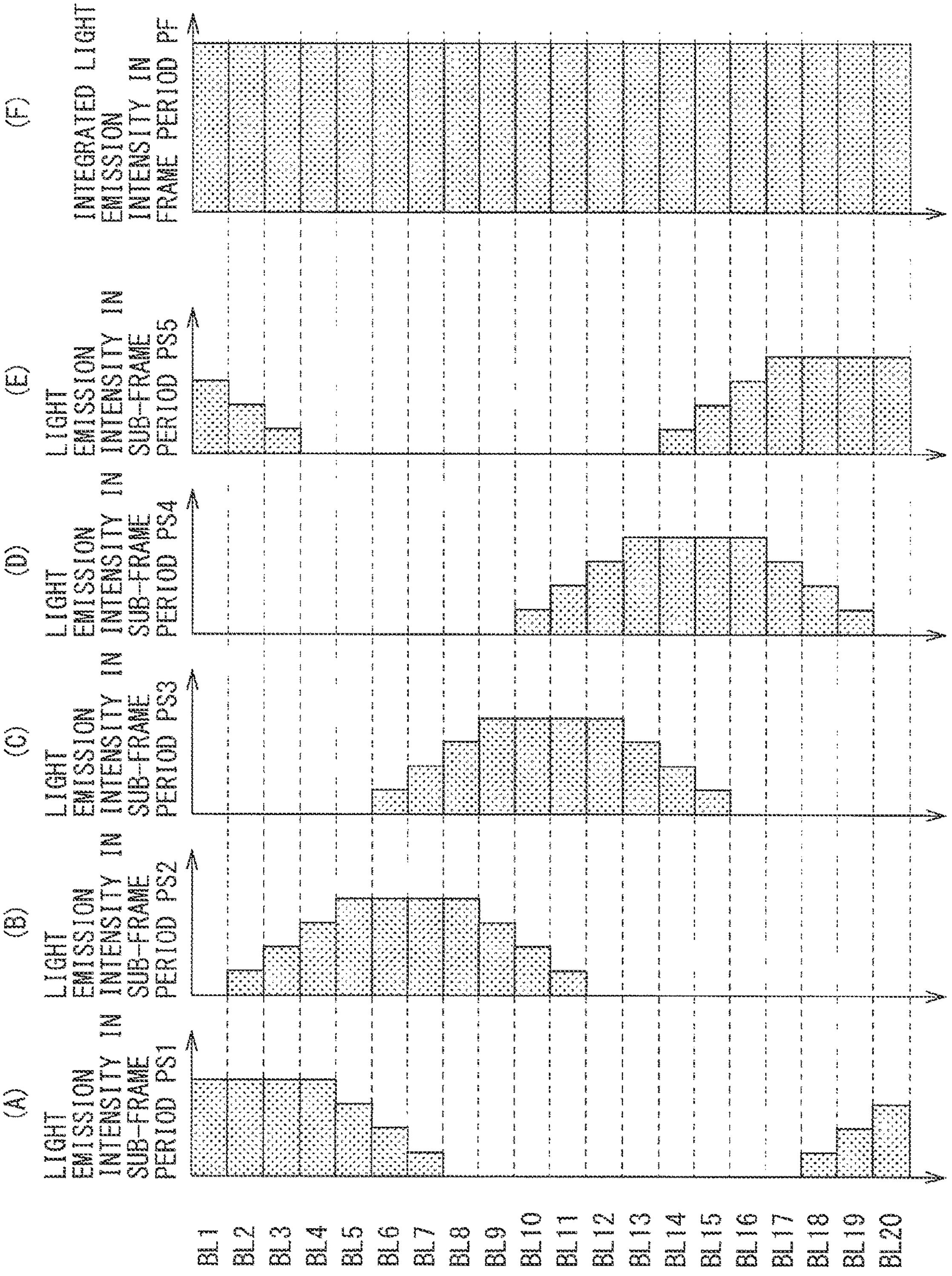

[ FIG. 7 ]
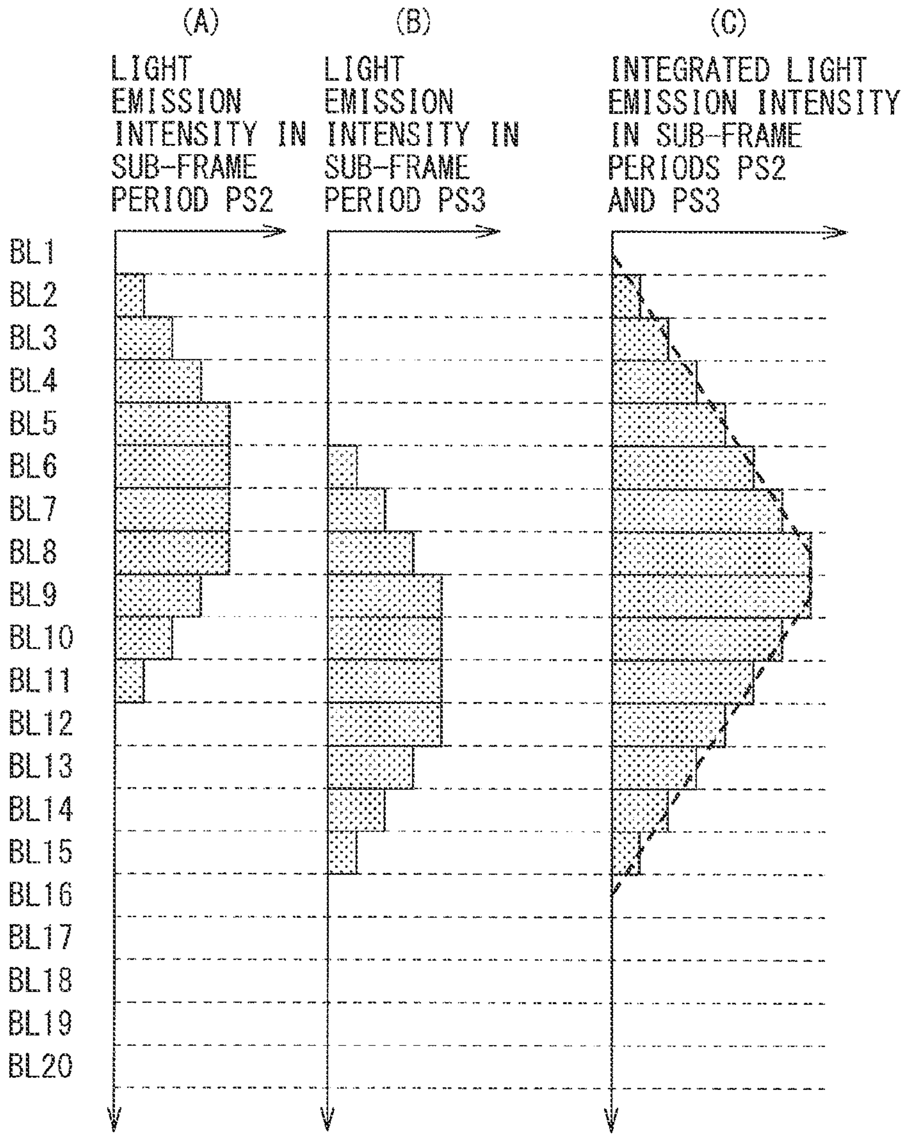

[FIG. 8]
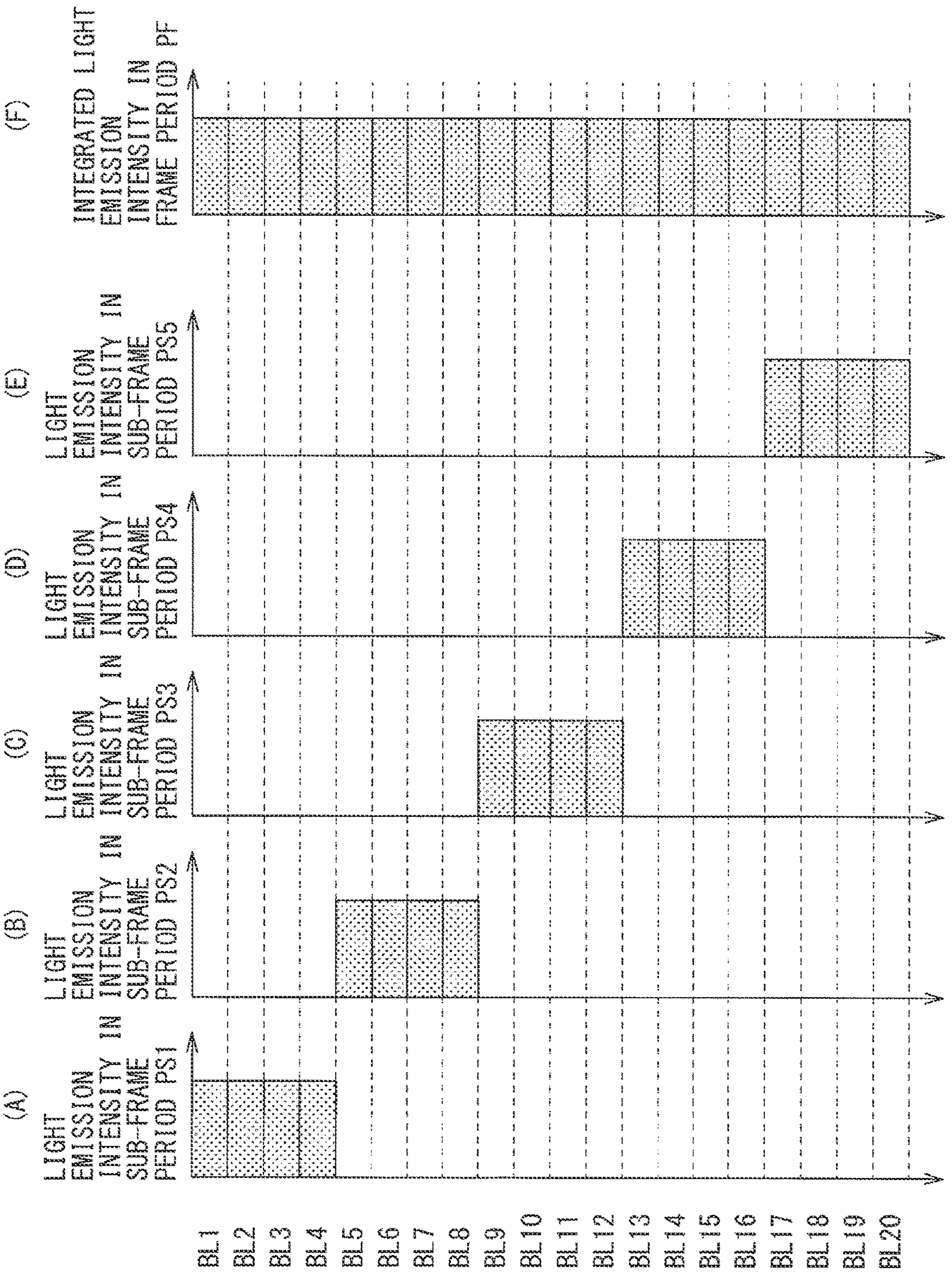

[ FIG. 9 ]
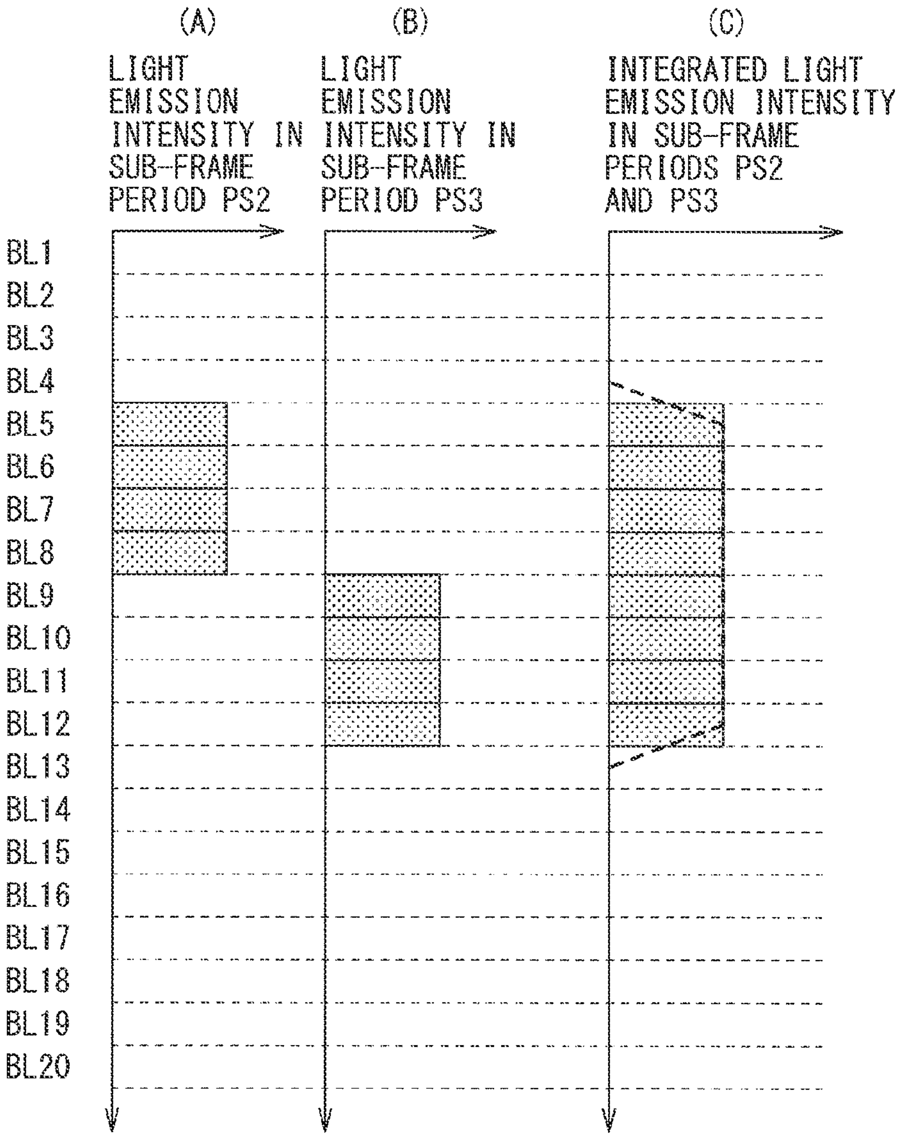

[ FIG. 10 ]
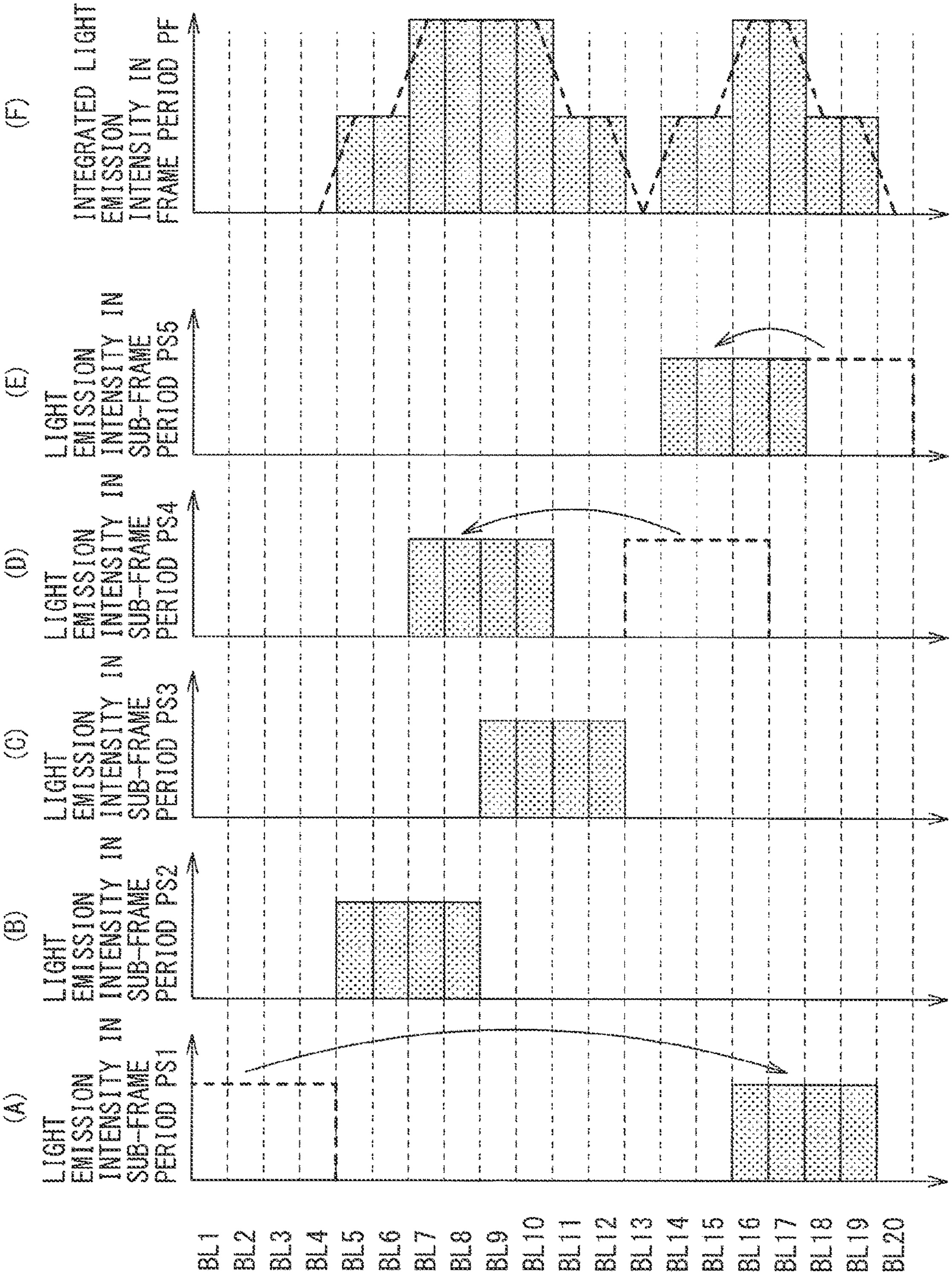

[ FIG. 11 ]
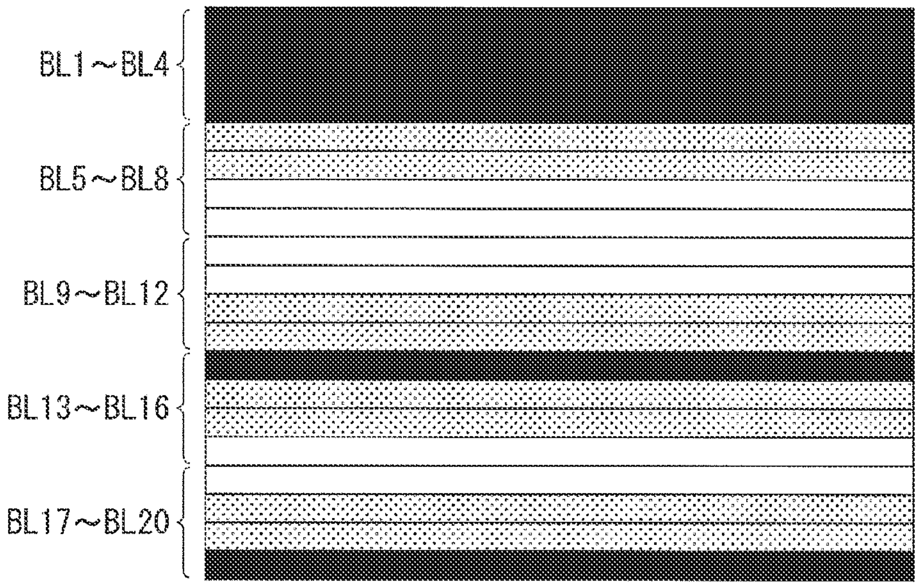

[FIG. 12]
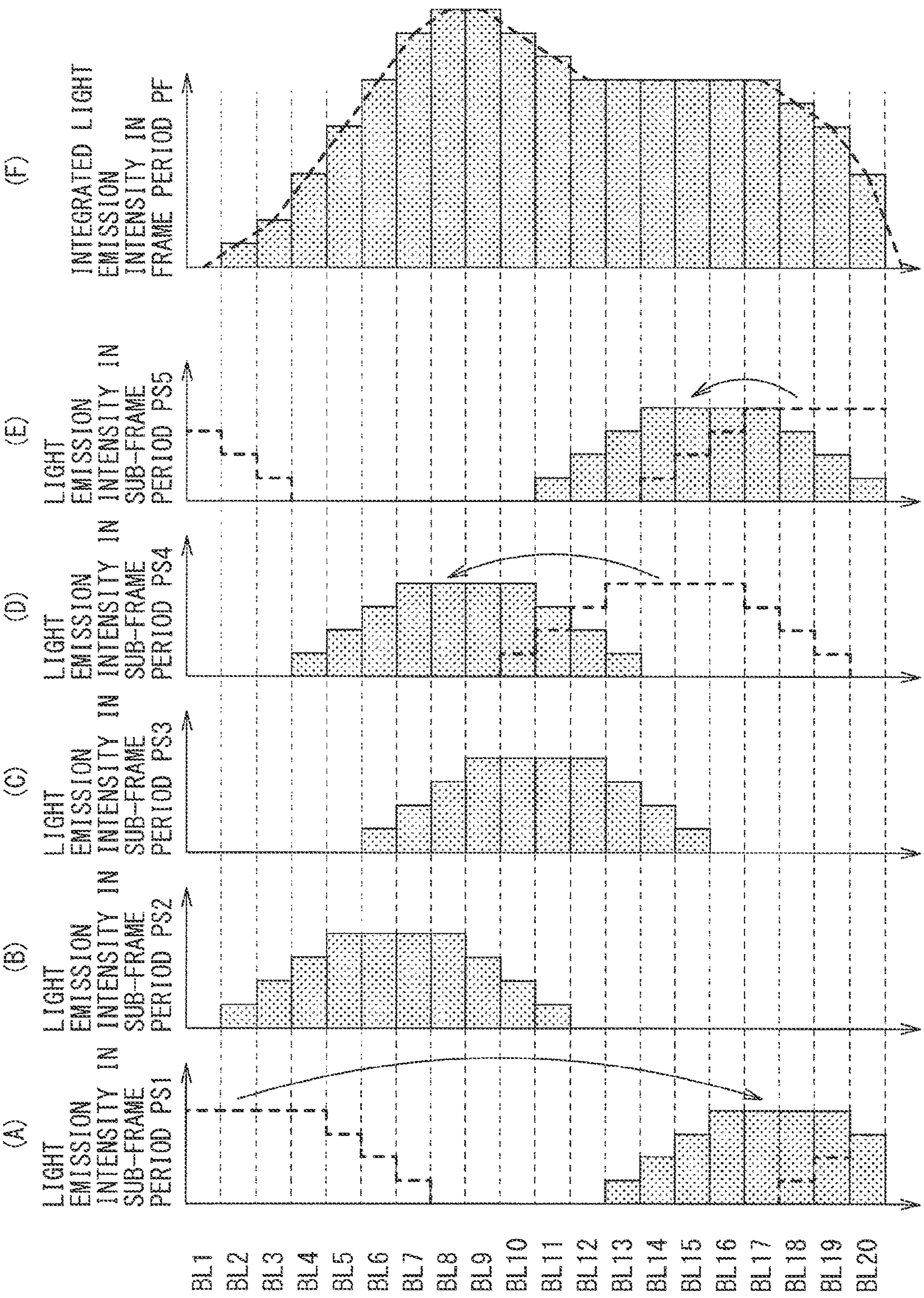

[ FIG. 13 ]
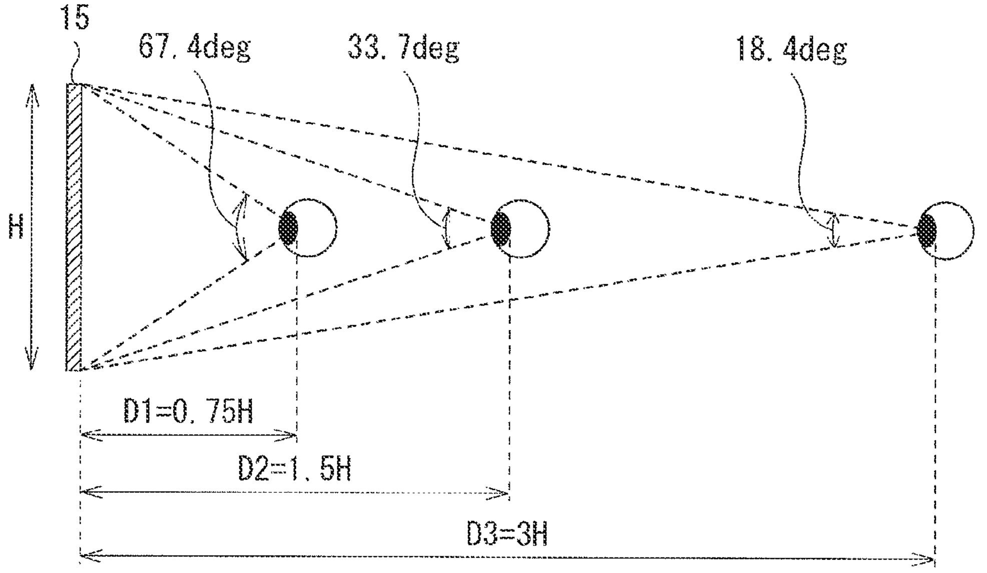
[ FIG. 14 ]
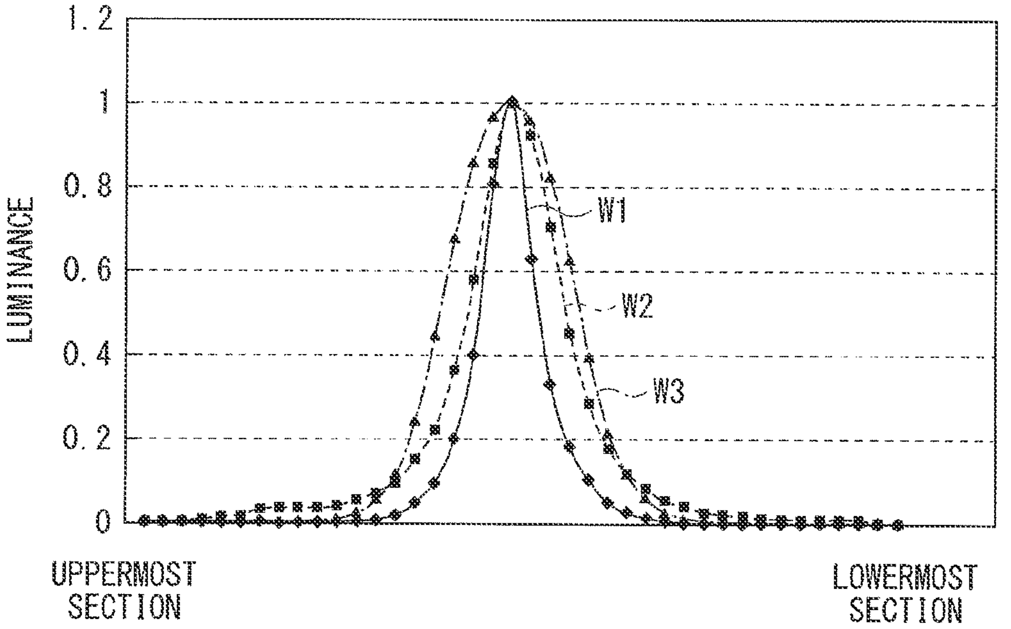

[FIG. 15]
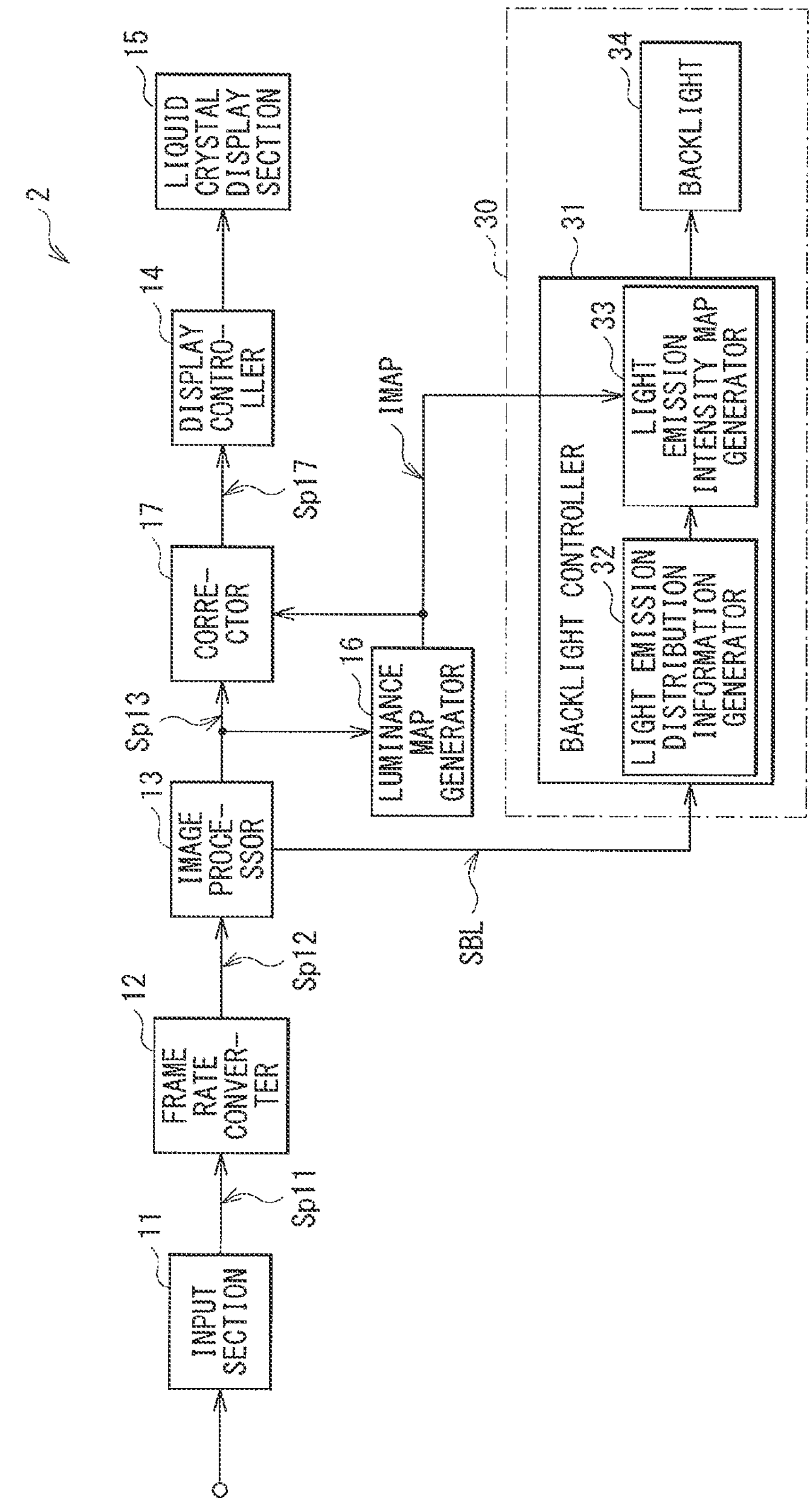

[ FIG. 16 ]
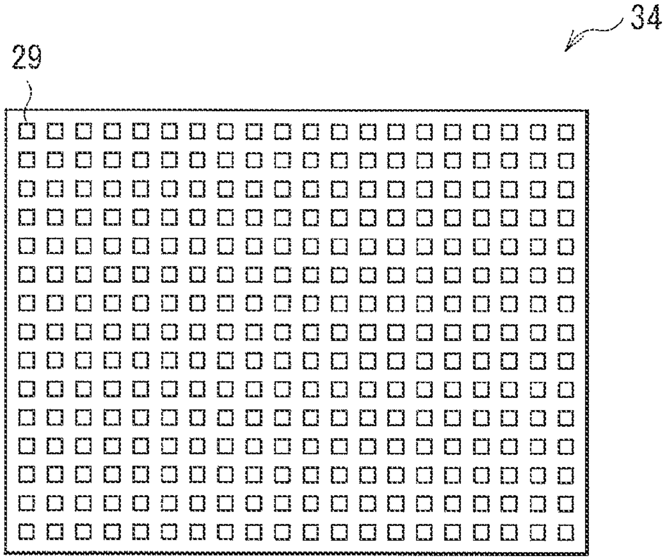
[ FIG. 17 ]
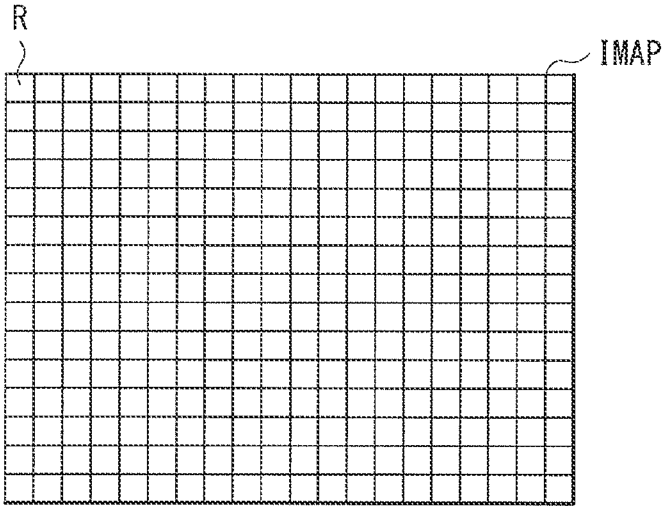

[ FIG. 18 ]
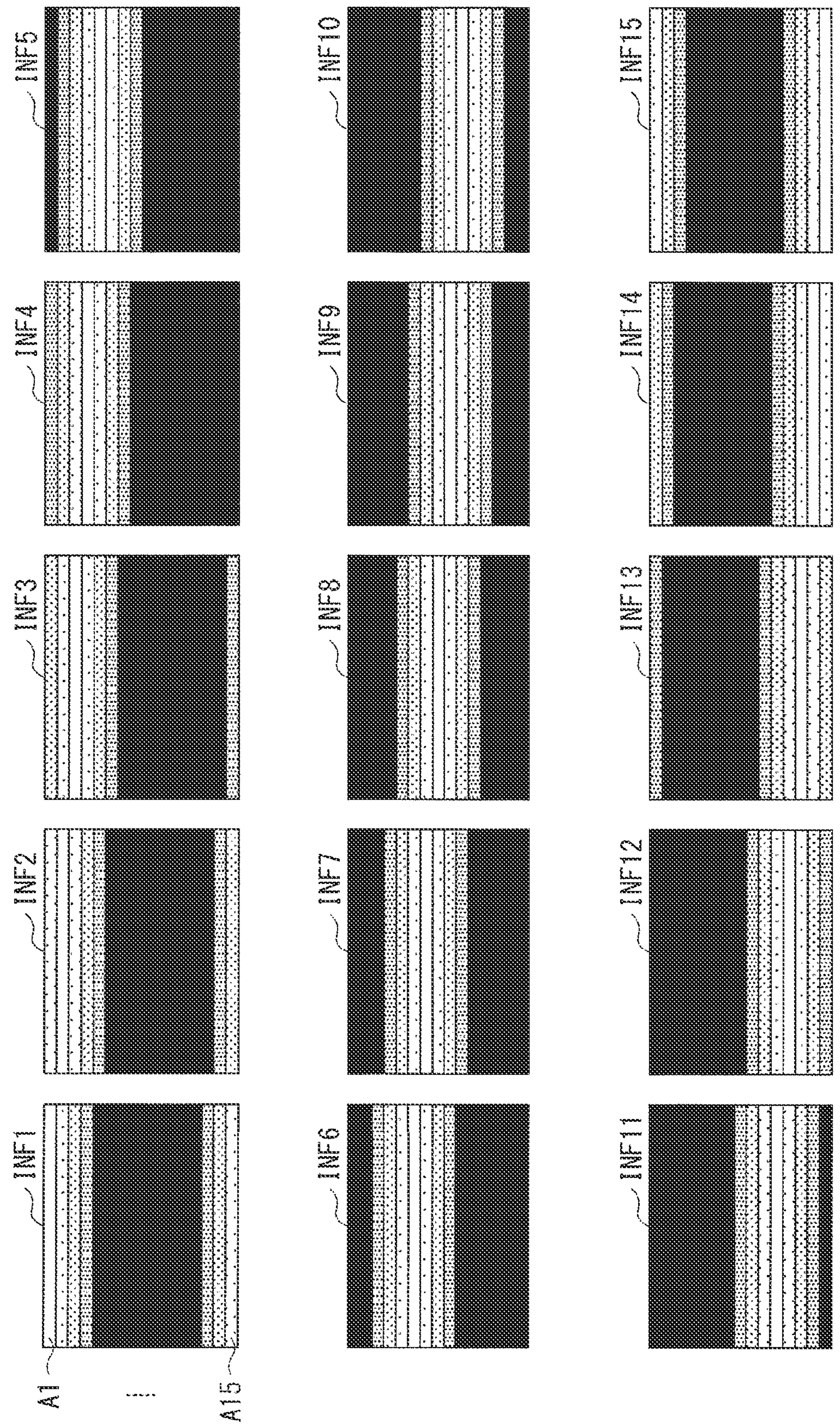

[ FIG. 19A ]
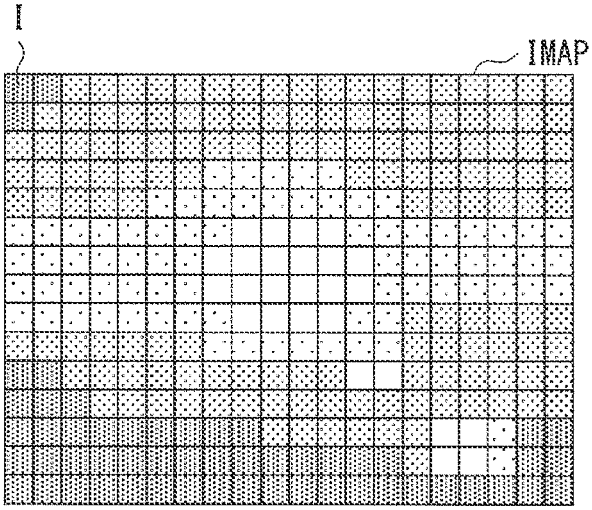
[ FIG. 19B ]
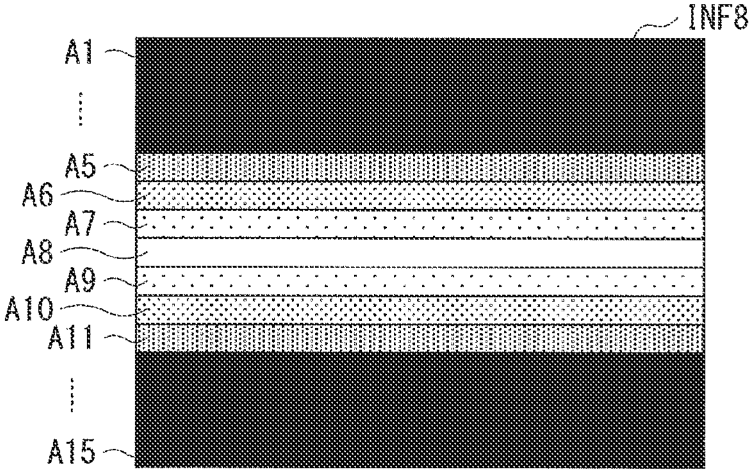
[ FIG. 19C ]
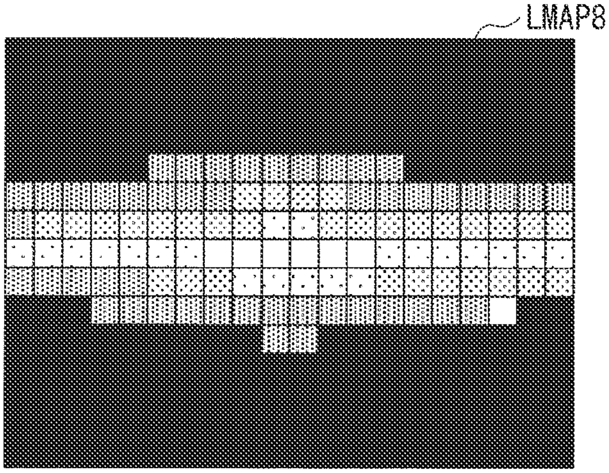

[ FIG. 20 ]
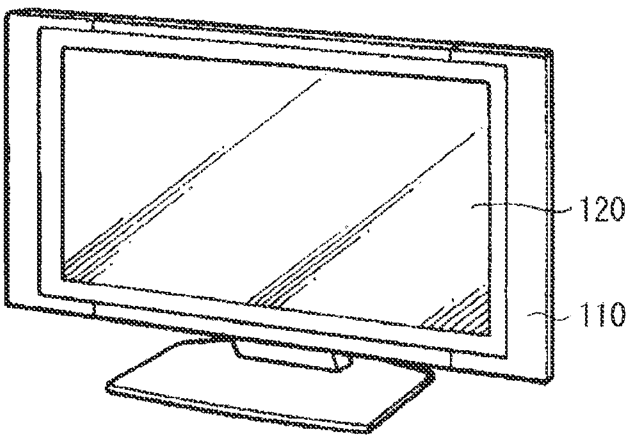

BACKLIGHT SYSTEM, DISPLAY APPARATUS, AND LIGHT EMISSION CONTROL METHOD

CROSS-REFERENCE TO RELATED APPLICATIONS

The present application is a continuation of U.S. patent application Ser. No. 16/098,936, filed on Nov. 5, 2018, which is a national phase entry under 35 U.S.C. § 371 of International Application No. PCT/JP2017/007126, filed on Feb. 24, 2017, which claims the benefit of Japanese Priority Patent Application No. 2016-109175, filed on May 31, 2016, the disclosures of which are hereby incorporated herein by reference.

TECHNICAL FIELD

The present disclosure relates to a backlight system, a display apparatus, and a light emission control method used in the backlight system.

BACKGROUND ART

In a liquid crystal display apparatus, for example, light emitted from a backlight is modulated by a liquid crystal display section to display an image. For example, PTL 1 discloses a liquid crystal display apparatus using a line-scanning backlight.

SUMMARY OF THE INVENTION

Incidentally, in general, high image quality is desired in display apparatuses, and a further improvement in image quality is expected.

It is desirable to provide a backlight system, a display apparatus, and a light emission control method that enables enhancement of image quality in the display apparatus.

A backlight system according to an embodiment of the present disclosure includes a backlight and a controller. The backlight includes a plurality of light-emitting devices that are allowed to emit light at mutually different timings and include a first light-emitting device and a second light-emitting device. The controller controls a light emission operation of the backlight to cause the first light-emitting device and the second light-emitting device to emit light with mutually different average light emission intensities in a first sub-frame period of a plurality of sub-frame periods provided corresponding to a frame period.

A first display apparatus according to an embodiment of the present disclosure includes a display section and a backlight unit. The backlight unit includes a backlight and a controller. The backlight includes a plurality of light-emitting devices that are allowed to emit light at mutually different timings and include a first light-emitting device and a second light-emitting device. The controller controls a light emission operation of the backlight to cause the first light-emitting device and the second light-emitting device to emit light with mutually different average light emission intensities in a first sub-frame period of a plurality of sub-frame periods provided corresponding to a frame period.

A second display apparatus according to an embodiment of the present disclosure includes a map generator, a display section, a backlight, and a controller. The map generator generates a luminance map on the basis of image data of a frame image. The display section displays the frame image by scanning in a first direction. The backlight includes a plurality of light-emitting devices arranged side by side in the first direction and a second direction intersecting with the first direction, and performs a light emission operation by scanning in the first direction. The controller generates light emission distribution information in the first direction in each of a plurality of sub-frame periods provided corresponding to a frame period, and controls the light emission operation of the backlight on the basis of the luminance map and the light emission distribution information.

A light emission control method according to an embodiment of the present disclosure includes: setting a plurality of sub-frame periods corresponding to a frame period; and controlling a light emission operation of a backlight to cause a first light-emitting device and a second light-emitting device in the backlight to emit light with mutually different average light emission intensities in a first sub-frame period of the plurality of sub-frame periods.

The backlight system, the first display apparatus, and the light emission control method according to the embodiments of the present disclosure, the plurality of sub-frame periods are set corresponding to the frame period. Thereafter, in the first sub-frame period of the plurality of sub-frame periods, a first display device and a second display device are controlled to emit light with mutually different average light emission intensities.

In the second display apparatus according to the embodiment of the present disclosure, the luminance map is generated on the basis of the image data of the frame image. Moreover, the plurality of sub-frame periods are set corresponding to the frame period, and light emission distribution information is generated in each of the plurality of sub-frame periods. Thereafter, the light emission operation of each of the light-emitting devices is controlled on the basis of the luminance map and the light emission distribution information.

According to the backlight system, the first display apparatus, and the light emission method according to the embodiments of the present disclosure, the first light-emitting device and the second light-emitting device are controlled to emit light with mutually different average light emission intensities, which makes it possible to enhance image quality in the display apparatus.

According to the second display apparatus according to the embodiment of the present disclosure, in each of the plurality of sub-frame periods, the light emission operation of each of the light-emitting devices is controlled on the basis of the luminance map and the light emission distribution information, which makes it possible to enhance image quality.

It is to be noted that effects described here are not necessarily limited and any of effects described in the present disclosure may be included.

BRIEF DESCRIPTION OF THE DRAWINGS

FIG. 1 is a block diagram illustrating a configuration example of a display apparatus according to a first embodiment of the present disclosure.

FIG. 2A is an explanatory diagram illustrating an operation example of a frame rate converter illustrated in FIG. 1.

FIG. 2B is another explanatory diagram illustrating an operation example of the frame rate converter illustrated in FIG. 1.

FIG. 3 is an exploded perspective view of a placement example of a liquid crystal display section and a backlight that are illustrated in FIG. 1.

FIG. 4A is an explanatory diagram illustrating a configuration example of the backlight illustrated in FIG. 1.

FIG. 4B is an explanatory diagram illustrating a configuration example of the backlight illustrated in FIG. 1.

FIG. 5 is a timing chart illustrating an operation example of the display apparatus illustrated in FIG. 1.

FIG. 6 is an explanatory diagram illustrating an operation example of the display apparatus illustrated in FIG. 1.

FIG. 7 is another explanatory diagram illustrating an operation example of the display apparatus illustrated in FIG. 1.

FIG. 8 is an explanatory diagram illustrating an operation example of a display apparatus according to a comparative example.

FIG. 9 is another explanatory diagram illustrating an operation example of the display apparatus according to the comparative example.

FIG. 10 is another explanatory diagram illustrating an operation example of the display apparatus according to the comparative example.

FIG. 11 is an explanatory diagram illustrating an example of a display screen in the display apparatus according to the comparative example.

FIG. 12 is another explanatory diagram illustrating an operation example of the display apparatus illustrated in FIG. 1.

FIG. 13 is an explanatory diagram for description of a relationship between a spatial frequency and a viewing distance.

FIG. 14 is a characteristic diagram illustrating light distribution characteristics.

FIG. 15 is a block diagram illustrating a configuration example of a display apparatus according to a second embodiment.

FIG. 16 is an explanatory diagram illustrating a configuration example of a backlight illustrated in FIG. 15.

FIG. 17 is an explanatory diagram illustrating a structure example of a luminance map.

FIG. 18 is an explanatory diagram illustrating an example of light emission distribution information.

FIG. 19A is an explanatory diagram illustrating an operation example of a luminance map generator illustrated in FIG. 15.

FIG. 19B is an explanatory diagram illustrating an operation example of a light emission distribution information generator illustrated in FIG. 15.

FIG. 19C is an explanatory diagram illustrating an operation example of a light emission intensity map generator illustrated in FIG. 15.

FIG. 20 is a perspective view of an external appearance configuration of a television to which any of the display apparatuses according to the embodiments is applied.

MODES FOR CARRYING OUT THE INVENTION

In the following, some embodiments of the present disclosure are described in detail with reference to the drawings. It is to be noted that description is given in the following order.

1. First Embodiment
2. Second Embodiment
3. Application Examples

1. First Embodiment

Configuration Example

FIG. 1 illustrates a configuration example of a display apparatus (a display apparatus 1) to which a backlight system according to a first embodiment is applied. It is to be noted that a display apparatus and a light emission method according to embodiments of the present disclosure are embodied by the present embodiment, and thus are described together. The display apparatus 1 includes an input section 11, a frame rate converter 12, an image processor 13, a display controller 14, a liquid crystal display section 15, and a backlight system 20.

The input section 11 is an input interface, and generates and outputs an image signal Sp11 on the basis of an image signal supplied from an external device. In this example, the image signal to be supplied to the display apparatus 1 is a progressive signal with 60 frames per second.

The frame rate converter 12 performs frame rate conversion on the basis of the image signal Sp11 to generate an image signal Sp12. In this example, the frame rate converter 12 doubles the frame rate from 60 [fps] to 120 [fps].

FIG. 2A illustrates an image to be subjected to frame rate conversion, and FIG. 2B illustrates an image having been subjected to the frame rate conversion. The frame rate converter 12 performs the frame rate conversion through performing frame interpolation processing on the basis of two frame images F adjacent to each other on a time axis to generate a frame image Fi and inserting the frame image Fi between these frame images F. For example, in a case of a picture in which a ball 9 moves from the left to the right as illustrated in FIG. 2A, the ball 9 moves more smoothly through inserting the frame image Fi between the frame images F adjacent to each other, as illustrated in FIG. 2B.

In the display apparatus 1, the frame rate converter 12 performs the frame rate conversion, which makes it possible to reduce so-called hold-blur. In other words, in general, in a liquid crystal display apparatus, a pixel state is continuously kept during a frame period, thereby causing hold-blur. In the display apparatus 1, the frame image Fi generated by the frame interpolation processing is inserted between two frame images F, which makes it possible to reduce such hold-blur.

Moreover, in the display apparatus 1, the frame rate converter 12 performs the frame rate conversion, which makes it possible to reduce a possibility that a user perceives flicker while viewing a display screen. In other words, in general, in a case where a flashing frequency of an image is equal to or lower than a critical fusion frequency (CFF; Critical Flicker Frequency) (for example, about 90 [Hz]), a human perceives flicker while viewing the image. In the display apparatus 1, the frame rate is enhanced, which makes it possible to reduce the possibility that the user perceives flicker while viewing the display screen.

The image processor 13 performs predetermined image processing such as color gamut adjustment and contrast adjustment on the basis of the image signal Sp12 to output a result of the processing as an image signal Sp13. Moreover, the image processor 13 also has a function of generating a backlight synchronization signal SBL in synchronization with the image signal Sp13.

The display controller 14 controls a display operation in the liquid crystal display section 15 on the basis of the image signal Sp13. The liquid crystal display section 15 performs the display operation by line-sequential scanning on the basis of a control signal supplied from the display controller 14.

The backlight system 20 includes a backlight controller 21 and a backlight 22. The backlight controller 21 controls a light emission operation of the backlight 22 on the basis of the backlight synchronization signal SBL. The backlight 22 emits light toward the liquid crystal display section 15 on the basis of a control signal supplied from the backlight controller 21.

FIG. 3 illustrates placement of the backlight 22. The display apparatus 1 further includes a diffuser plate 19. The diffuser plate 19 diffuses incident light. In the display apparatus 1, the liquid crystal display section 15, the diffuser plate 19, and the backlight 22 are disposed in this order, as illustrated in FIG. 3. With this configuration, in the display apparatus 1, light emitted from the backlight 22 is diffused by the diffuser plate 19, and the thus-diffused light is modulated by the liquid crystal display section 15.

FIG. 4A illustrates a configuration example of the backlight 22, and FIG. 4B schematically illustrates the backlight 22. The backlight 22 includes a plurality of light-emitting devices 29. The light-emitting devices 29 each use, for example, an LED (Light Emitting Diode). The plurality of light-emitting devices 29 are arranged side by side in a matrix. Moreover, one row of the light-emitting devices 29 configures a light-emitting section BL. The backlight 22 includes twenty light-emitting sections BL (light-emitting sections BL1 to BL20), as illustrated in FIG. 4B.

With this configuration, the backlight controller 21 controls a light emission operation of each of the light-emitting sections BL in synchronization with line-sequential scanning in the liquid crystal display section 15. At this time, the backlight controller 21 sets light emission intensities of the twenty light-emitting sections BL in each sub-frame period PS, as described later.

Here, the backlight controller 21 corresponds to a specific example of a "controller" in the present disclosure. The liquid crystal display section 15 corresponds to a specific example of a "display section" in the present disclosure.

[Operation and Workings]

Next, description is given of operation and workings of the display apparatus 1 according to the present embodiment.

(Outline of Entire Operation)

First, an outline of an entire operation of the display apparatus 1 is described with reference to FIG. 1. The input section 11 generates and outputs the image signal Sp11 on the basis of the image signal supplied from the external device. The frame rate converter 12 performs frame rate conversion on the basis of the image signal Sp11 to generate the image signal Sp12. The image processor 13 performs the predetermined image processing such as color gamut adjustment and contrast adjustment on the basis of the image signal Sp12 to output a result of the processing as the image signal Sp13. Moreover, the image processor 13 generates the backlight synchronization signal SBL in synchronization with the image signal Sp13. The display controller 14 controls the display operation in the liquid crystal display section 15 on the basis of the image signal Sp13. The liquid crystal display section 15 performs the display operation by line-sequential scanning on the basis of the control signal supplied from the display controller 14. The backlight controller 21 controls the light emission operation of the backlight 22 on the basis of the backlight synchronization signal SBL. The backlight 22 emits light toward the liquid crystal display section 15 on the basis of the control signal supplied from the backlight controller 21.

(Specific Operation)

FIG. 5 illustrates a timing chart of the display operation in the display apparatus 1, where (A) indicates an operation of the liquid crystal display section 15 and (B) indicates an operation of the backlight 22. A vertical axis of (A) of FIG. 5 indicates a scanning position in a line-sequential scanning direction of the liquid crystal display section 15. In (A) of FIG. 5, "F(n)" indicates a state in which the liquid crystal display section 15 displays an n-th frame image F(n), "Fi(n)" indicates a state in which the liquid crystal display section 15 displays an n-th frame image Fi(n), "F(n+1)" indicates a state in which the liquid crystal display section 15 displays an (n+1)-th frame image F(n+1), and "Fi(n+1)" indicates a state in which the liquid crystal display section 15 displays an (n+1)-th frame image Fi(n+1). Moreover, in (B) of FIG. 5, a white portion indicates that the light-emitting section BL emits light with a high light emission intensity, a black portion indicates that the light-emitting section BL does not emit light, and a shaded portion indicates that light is emitted with a light emission intensity corresponding to darkness of the shaded portion.

In the display apparatus 1, frame images are supplied in a cycle T0 of, for example, 16.7 [msec.] (=1/60 [Hz]), and the frame rate converter 12 doubles the frame rate to output the respective frame images having been subjected to the frame rate conversion in a cycle T1 of 8.3 [msec.] (=1/60 [Hz]/2). Thereafter, the liquid crystal display section 15 performs the display operation on the basis of the respective frame images having been subjected to the frame rate conversion. In other words, the cycle T1 corresponds to a frame period PF in the liquid crystal display section 15. Moreover, the backlight 22 performs the light emission operation in synchronization with the display operation in the liquid crystal display section 15, which is described in detail below.

First, as illustrated in (A) of FIG. 5, the liquid crystal display section 15 performs line-sequential scanning from an uppermost section to a lowermost section in a period from a timing t0 to a timing t1 on the basis of the control signal supplied from the display controller 14 to display the frame image F(n). Likewise, the liquid crystal display section 15 performs line-sequential scanning in a period from the timing t1 to a timing t2 to display the frame image Fi(n), performs line-sequential scanning in a period from the timing t2 to a timing t3 to display the frame image F(n+1), and performs line-sequential scanning in a period from the timing t3 to a timing t4 to display the frame image Fi(n+1).

Each of the light-emitting sections BL1 to BL20 of the backlight 22 performs the light emission operation in synchronization with line-sequential scanning in the liquid crystal display section 15. Specifically, the backlight controller 21 sets five sub-frame periods PS (sub-frame periods PS1 to PS5) corresponding to each frame period PF on the basis of the backlight synchronization signal SBL. Each of time lengths of these sub-frame periods PS is 1/5 of a time length of the frame period PF in this example. Thereafter, the backlight controller 21 individually sets light emission intensities of the twenty light-emitting sections BL in each of the sub-frame periods PS for each of the light-emitting sections BL.

It is to be noted that a relative timing relationship between line-sequential scanning in the liquid crystal display section 15 and the sub-frame periods PS1 to PS5 in the backlight 22 is not limited to the example illustrated in FIG. 5. This relative timing relationship is appropriately set in accordance with, for example, characteristics of a liquid crystal used for the liquid crystal display section 15, kinds of contents to be displayed, and the like.

(Setting of Light Emission Intensity)

FIG. 6 illustrates a characteristic example of the display apparatus 1, where (A) to (E) respectively indicate light emission intensities of the respective light-emitting sections BL in the sub-frame periods PS1 to PS5, and (F) indicates integrated light emission intensities in the respective light-emitting sections BL in the frame period PF.

The backlight controller 21 sets the light emission intensities of four light-emitting sections BL1 to BL4 to, for example, "100" (in an arbitrary unit) in the sub-frame period PS1 ((A) of FIG. 6), sets the light emission intensities of four light-emitting sections BL5 to BL8 to, for example, "100" in the sub-frame period PS2 ((B) of FIG. 6), sets the light emission intensities of four light-emitting sections BL9 to BL12 to, for example, "100" in the sub-frame period PS3 ((C) of FIG. 6), sets the light emission intensities of four light-emitting sections BL13 to BL16 to, for example, "100" in the sub-frame period PS4 ((D) of FIG. 6), and sets the light emission intensities of four light-emitting sections BL17 to BL20 to, for example, "100" in the sub-frame period PS5 ((E) of FIG. 6).

Moreover, for example, in the sub-frame period PS1, the backlight controller 21 sets the light emission intensities of two light-emitting sections BL5 and BL20 to, for example, "75", sets the light emission intensities of two light-emitting sections BL6 and BL19 to, for example, "50", and sets the light emission intensities of two light-emitting sections BL7 and BL18 to, for example, "25" ((A) of FIG. 6). In other words, the backlight controller 21 sets the light emission intensities of the respective light-emitting sections BL so as not to abruptly change the light emission intensities in a scanning direction (an upward-downward direction in FIG. 6). This also applies to the sub-frame periods PS2 to PS5.

In this case, the integrated light emission intensity of each of the light-emitting sections BL in the frame period including five sub-frame periods PS1 to PS5 is "175", and is constant irrespective of the light-emitting sections BL ((F) of FIG. 6). Accordingly, in this case, a user does not perceive luminance unevenness while viewing a screen of the display apparatus 1.

It is to be noted that an actual light distribution in each of the sub-frame periods PS has a shape represented by a distribution characteristic in a light emission direction in each of the light-emitting devices 29 or, for example, a Lorentz distribution by the diffuser plate 19. However, as illustrated in (F) of FIG. 6, the integrated light emission intensity of each of the light-emitting sections BL is set to be constant irrespective of the light-emitting sections BL, which makes it possible to reduce a possibility that the user perceives luminance unevenness while viewing the screen of the display apparatus 1.

Incidentally, in general, in a case where the frame rate of the display apparatus is equal to or higher than 240 [fps], even if the frame rate is further increased, the user is less likely to perceive an improvement in image quality. This indicates that in a case where the frame rate of the display apparatus is equal to or higher than 240 [fps], visual perception while viewing the display screen of the display apparatus is close to visual perception while directly viewing a nature scene with eyes. Accordingly, the integrated light emission intensity in a time length equal to a time length (4.2 [msec.]) of one frame period corresponding to this 240 [fps] may be one indication representing a characteristic.

FIG. 7 illustrates integrated light emission intensities of the respective light-emitting sections BL in two sub-frame periods PS2 and PS3. A time length of each of the sub-frame periods PS is 1.7 [msec.] (=$\frac{1}{60}$ [Hz]/$\frac{2}{5}$), and a time length of the two sub-frame periods PS2 and PS3 is therefore 3.3 [msec.]. It is considered that this time length is slightly shorter than the above-described time length (4.2 [msec.]) of one frame period corresponding to 240 [fps], but it is possible to use this time length as a reference. The integrated light emission intensities of the respective light-emitting sections BL in the two sub-frame periods PS2 and PS3 are gradually changed in the scanning direction (an upward-downward direction in FIG. 7), as illustrated in (C) of FIG. 7.

Thus, in the display apparatus 1, the light emission intensities of the respective light-emitting sections BL in each of the sub-frame periods PS are gradually changed in the scanning direction, as illustrated in FIGS. 6 and 7. This makes it possible to reduce a possibility that image quality is deteriorated in the display apparatus 1, as described below in comparison with a comparative example.

Comparative Example

Next, description is given of workings and effects of the display apparatus 1 according to the present embodiment in comparison with the comparative example.

FIG. 8 illustrates a characteristic example of a display apparatus 1R according to the comparative example. As with the backlight controller 21 according to the present embodiment, a backlight controller 21R of a backlight system 20R in the display apparatus 1R sets light emission intensities of four light-emitting sections BL1 to BL4 to, for example, "100" in the sub-frame period PS1, sets light emission intensities of four light-emitting section BL5 to BL8 to, for example, "100" in the sub-frame period PS2, sets light emission intensities of four light-emitting sections BL9 to BL12 to, for example, "100" in the sub-frame period PS3, sets light emission intensities of four light-emitting section BL13 to BL16 to, for example, "100" in the sub-frame period PS4, and sets light emission intensities of four light-emitting section BL17 to BL20 to, for example, "100" in the sub-frame period PS5. At this time, the backlight controller 21 sets light emission intensities of light-emitting sections other than four light-emitting sections BL that are caused to emit light to "0" in each of the sub-frame periods PS.

In this case, integrated light emission intensities of the respective light-emitting sections BL in the frame period PF is "100", and is constant irrespective of the light-emitting sections BL ((F) of FIG. 8). Accordingly, the user does not perceive luminance unevenness while viewing a screen of the display apparatus 1R.

FIG. 9 illustrates integrated light emission intensities of the respective light-emitting sections BL in two sub-frame periods PS2 and PS3. The integrated light emission intensities of the respective light-emitting sections BL in the sub-frame periods PS2 and PS3 ((C) of FIG. 9) differs from those in the display apparatus 1 according to the present embodiment ((C) of FIG. 7) in that the integrated light emission intensities are abruptly changed in the scanning direction (an upward-downward direction in FIG. 9) between the light-emitting section BL4 and the light-emitting section BL5 and between the light-emitting section BL12 and the light-emitting section BL13. Hence, in the display apparatus 1R according to the comparative example, there is a possibility that image quality is deteriorated, as described below.

(Afterimage with Eyes Fixed and Saccadic Eye Movement)

Afterimages in human vision include an afterimage with eyes fixed. The afterimage with eyes fixed is an afterimage perceived by retinas in a case where a view point is not moved. In a case where a human views the display screen of the display apparatus, the light-emitting sections BL sequentially emit light; therefore, light emitted from the light-emitting sections BL having emitted light in the past is perceived as an afterimage.

Moreover, human's eye movements include a saccadic eye movement in which in order to catch a target captured in a peripheral visual field, the line of sight is moved unconsciously at high speed. Speed of movement of eyes in this saccadic eye movement is, for example, 1000 [deg./sec.]. In a case where such a saccadic eye movement occurs, visual perception is suppressed, but a bright-dark pattern (a contrast pattern) having a low spatial frequency is recognizable.

A mixture of such an afterimage with eyes fixed and such a saccadic eye movement may cause the following phenomenon.

FIG. 10 illustrates another characteristic example of the display apparatus 1R according to the comparative example. It is to be noted that FIG. 10 is exaggerated. The backlight controller 21R controls a light emission operation of the backlight 22 so as to cause the backlight 22 to sequentially emit light from the light-emitting section BL1 in units of four light-emitting sections BL in the sub-frame periods PS1 to PS5, as illustrated in FIG. 8. However, in this example, by the afterimage with eyes fixed and the saccadic eye movement, the user perceives as if four light-emitting sections BL16 and BL19 emitted light in the sub-frame period PS1, perceives as if four light-emitting sections BL5 to BL8 emitted light in the sub-frame period PS2, perceives as if four light-emitting sections BL9 to BL12 emitted light in the sub-frame period PS2, perceives as if four light-emitting sections BL7 to BL10 emitted light in the sub-frame period PS4, and perceives as if four light-emitting sections BL14 to BL17 emitted light in the sub-frame period PS5. In other words, in actuality, for example, four light-emitting sections BL1 to BL4 emit light in the sub-frame period PS1, four light-emitting sections BL13 to BL16 emit light in the sub-frame period PS4, and four light-emitting sections BL17 to BL20 emit light in the sub-frame period PS5; however, eyes of the user perform the saccadic eye movement, which causes the user to perceive as if a light-emitting section different from a light-emitting section actually emitting light emitted light.

Accordingly, in the display apparatus 1R according to the comparative example, integrated light emission intensities of the respective light-emitting sections BL in the frame period PF including five sub-frame periods PS1 to PS5 are abruptly changed in the scanning direction (an upward-downward direction in FIG. 10) between the light-emitting sections BL4 and BL5, between the light-emitting sections BL6 and BL7, between the light-emitting sections BL10 and BL11, between the light-emitting sections BL12 and BL13, between the light-emitting sections BL13 and BL14, between the light-emitting sections BL15 and BL16, between the light-emitting sections BL17 and BL18, and between the light-emitting sections BL19 and BL20 ((F) of FIG. 10). As a result, the user visually recognizes a strip-like pattern extending toward the right and the left while viewing the display screen.

FIG. 11 illustrates an example of the display screen. In this example, the liquid crystal display section 15 displays, for example, an entirely white uniform image. In spite of an intention of displaying a uniform image in such a manner, the integrated light emission intensities are abruptly changed in the scanning direction as illustrated in (F) of FIG. 10, which causes the user to visually recognize the strip-like pattern extending toward the right and the left, as illustrated in FIG. 11. In particular, in this example, the light-emitting sections BL in the backlight 22 sequentially emit light from the light-emitting section BL1 in units of four light-emitting sections BL; however, the user visually recognizes a strip-like pattern having a width narrower than a width of the four light-emitting sections BL. In this case, there is a possibility that the user perceives a deterioration in image quality.

Next, description is given of an example of characteristics in a case where the afterimage with eyes fixed and the saccadic eye movement occur in the display apparatus 1 according to the present embodiment.

FIG. 12 illustrates another characteristic example of the display apparatus 1 according to the present embodiment. It is to be noted that FIG. 11 is exaggerated. The backlight controller 21 controls the light emission operation of the backlight 22 so as to cause the backlight 22 to sequentially emit light from the light-emitting section BL1 in the sub-frame periods PS1 to PS5, as illustrated in FIG. 6. However, the eyes of the user perform the saccadic eye movement, which causes the user to perceive as if a light-emitting section different from a light-emitting section actually emitting light emitted light.

In this case, as illustrated in (F) of FIG. 12, integrated light emission intensities of the respective light-emitting sections BL in the frame period PF are gradually changed, as compared with the case of the display apparatus 1R according to the comparative example ((F) of FIG. 10). In other words, in the display apparatus 1, the backlight controller 21 sets the light emission intensities of the respective light-emitting sections BL so as not to abruptly change the light emission intensities in the scanning direction in each of the sub-frame periods PS, as illustrated in FIGS. 6 and 7. Accordingly, the integrated light emission intensities of the respective light-emitting sections BL in the frame period PF are gradually changed. As a result, in the display apparatus 1, it is possible to reduce a possibility that the user visually recognizes the strip-like pattern extending toward the right and the left while viewing the display screen.

As described above, the user is more likely to visually recognize the strip-like pattern in the case of the display apparatus 1R according to the comparative example ((F) of FIG. 10), and the user is less likely to visually recognize the strip-like pattern in the case of the display apparatus according to the present embodiment ((F) of FIG. 12). It is considered that this is caused by the following reason.

That is, in general, it is known that in comparison between a case where a human views a striped pattern (a sine-wave grating) in which brightness and darkness change in a sine-wave pattern and a case where the human views a striped pattern (a square-wave grating) in which brightness and darkness change in a rectangular-wave pattern, in particular, in a case where a spatial frequency of the pattern is low, the square-wave grating is visually recognized more easily than the sine-wave grating (for example, refer to Campbell, F. W., and Robson, J. G., "Application of Fourier analysis to the visibility of gratings", Journal of Physiology, vol. 197, pp. 551-566, 1968.). Here, the spatial frequency is the number of bright-dark cycle per degree of a viewing angle, and a unit thereof is [cycle/deg.]. In other words, in a case where brightness and darkness densely appear, the spatial frequency becomes high, and brightness and darkness coarsely appear, the spatial frequency becomes low. It is said that a characteristic in which the integrated light emission intensities are abruptly changed in the scanning direction as with the case of the display apparatus 1R according to the comparative example ((F) of FIG. 10) is close to the square-wave grating, and a characteristic in which the integrated light emission intensities are gradually changed in the scanning direction as with the case of the display apparatus 1 according to the present embodiment ((F) of FIG. 12) is close to the sine-wave grating. Accordingly, it is considered that the user is more likely to visually recognize the strip-like pattern in the case of the display apparatus 1R according to the comparative example, and the user is less likely to visually recognize the strip-like pattern in the case of the display apparatus 1 according to the present embodiment.

As described above, in the display apparatus 1R according to the comparative example, for example, the light emission intensities of the respective light-emitting sections BL are abruptly changed in the scanning direction in each of the sub-frame periods PS, as illustrated in FIGS. 8 and 9; therefore, in a case where the afterimage with eyes fixed and the saccadic eye movement occur, there is a possibility that image quality is deteriorated. In contrast, in the display apparatus 1 according to the present embodiment, for example, the light emission intensities of the respective light-emitting sections BL are gradually changed in each of the sub-frame periods PS, as illustrated in FIGS. 6 and 7; therefore, even in the case where the afterimage with eyes fixed and the saccadic eye movement occur, it is possible to reduce the possibility that image quality is deteriorated.

(Light Emission Profile)

Next, description is given of a distribution of light outputted from the diffuser plate 19 (a light emission profile).

The backlight controller 21 controls the light emission operation of the backlight 22 so as to cause the backlight 22 to sequentially emit light from the light-emitting section BL1 in the sub-frame periods PS1 to PS5, as illustrated in FIG. 6. In this example, in each of the sub-frame periods PS, the backlight controller 21 sets the light emission intensities of four light-emitting sections BL to, for example, "100", and sets light emission intensities of the light-emitting sections BL close to the four light-emitting sections BL so as not to abruptly change the light emission intensities in the scanning direction. Light emitted from these light-emitting sections BL enters the diffuser plate 19, and the light is diffused by the diffuser plate 19 and outputted from the diffuser plate 19. In each of the sub-frame periods PS, a distribution of the light outputted from the diffuser plate 19 is gentler than a distribution of light outputted from the backlight 22, and has, for example, a shape represented by the Lorentz distribution.

Incidentally, it is known that in a case where a human views the above-described sine-wave grating and the above-described square-wave grating, ease of visual recognition (perceptual sensitivity) of these gratings differs depending on spatial frequencies of patterns of the gratings. In a case where the user views a bright-dark pattern appearing on the display screen of the display apparatus, the spatial frequency of the pattern is changed depending on a distance between the user and the display screen of the display apparatus, as described below.

FIG. 13 illustrates a distance between the liquid crystal display section 15 and the user. In a case where the distance between the liquid crystal display section 15 and the user is short in this manner, a viewing angle is increased; therefore, the number of bright-dark cycles per degree of the viewing angle is decreased, thereby resulting in a decrease in the spatial frequency. Moreover, in a case where the distance between the liquid crystal display section 15 and the user is short, the viewing angle is decreased; therefore, the number of bright-dark cycles per degree of the viewing angle is increased, thereby resulting in an increase in the spatial frequency.

FIG. 14 illustrates an example of a distribution of light outputted from the diffuser plate 19 in a given sub-frame period PS. It is to be noted that this distribution of light is normalized at a maximum value. In this example, three characteristics W1 to W3 are illustrated. The characteristic W1 has the narrowest distribution width, and the characteristic W3 has the widest distribution width.

Display apparatuses were configured with use of backlights having three kinds of such characteristics, and image quality in a case where the afterimage with eye fixed and the saccadic eye movement occurred was confirmed. Here, the distance between the liquid crystal display section 15 and the user was set to a distance that was three times larger than a height H of the display screen (D3=3H) (FIG. 13). The reason for this is that, for example, in a case where the display apparatus is allowed to perform display at a full high-definition television image resolution, it is recommended that the user views the display screen at a position away from the display screen by the distance (D3=3H) that is three times larger than the height H of the display screen. As a result, in a case where a backlight having the characteristic W1 was used, the strip-like pattern extending toward the right and the left as illustrated in FIG. 11 was visually recognized. In contrast, in a case where a backlight having the characteristic W2 was used or in a case where a backlight having the characteristic W3 was used, such a strip-like pattern was not visually recognized.

As described above, in a case where the backlight having the characteristic W1 is used, a gradient of luminance is large; therefore, the strip-like pattern is more likely to be visually recognized, and in a case where the backlight having the characteristic W2 is used and in the case where the backlight having the characteristic W3 is used, the gradient of luminance is gentle; therefore, the strip-like pattern is less likely to be visually recognized. Here, a maximum gradient in the characteristic W2 is equal to a maximum gradient in the sine-wave grating having a spatial frequency of 0.27 [cycles/deg.]. It is to be noted that, in this example, a portion other than a bottom portion (for example, 0.2 or less) of the characteristic W2 is fit to a sine wave to determine the spatial frequency. Thus, it is found that in a case where the gradient in the distribution of light is equal to or lower than the maximum gradient in the sine-wave grating having a spatial frequency of 0.27 [cycles/deg.], the strip-like pattern extending toward the right and the left as illustrated in FIG. 11 is not visually recognized, and favorable image quality is achievable.

In the display apparatus 1, as illustrated in FIGS. 6 and 7, in each of the sub-frame periods PS, the light emission intensities of the respective light-emitting sections BL are individually set for each of the light-emitting sections BL. At this time, the light emission intensities of the respective light-emitting sections BL are set so as to cause the gradient in the distribution of light outputted from the diffuser plate 19 to be equal to or lower than the maximum gradient in the sine-wave grating having a spatial frequency of 0.27 [cycles/deg.], which makes it possible to enhance image quality.

Effects

As described above, in the present embodiment, in each of the sub-frame periods, light emission intensities of the respective light-emitting sections are gradually changed in the scanning direction, which makes it possible to enhance image quality.

In the present embodiment, the gradient in the distribution of light outputted from the diffuser plate is equal to or lower than the maximum gradient in the sine-wave grating having a spatial frequency of 0.27 [cycles/deg.], which makes it possible to enhance image quality.

Modification Example 1-1

In the foregoing embodiment, for example, the light-emitting sections BL that emit light in the sub-frame period PS1 continuously emit light throughout the sub-frame period PS1; however, the present embodiment is not limited thereto. Alternatively, for example, the light-emitting sections BL may emit light at a predetermined light emission duty ratio. Specifically, for example, in the sub-frame period PS1, a backlight controller 21A according to the present modification example may respectively set a light emission intensity and a light emission duty ratio of each of four light-emitting sections BL1 to BL4 to, for example, "100" and "100%", may respectively set a light emission intensity and a light emission duty ratio of each of two light-emitting sections BL5 and BL20 to "100" and "75%", may respectively set a light emission intensity and a light emission duty ratio of each of two light-emitting sections BL6 and BL19 to "100" and "50%", and may respectively set a light emission intensity and a light emission duty ratio of each of two light-emitting sections BL7 and BL18 to "100" and "25%". This also applies to the sub-frame periods PS2 to PS5. Even with such a configuration, in each of the sub-frame periods PS, it is possible to individually set average light emission intensities of the respective light-emitting sections BL, which makes it possible to achieve effects similar to those in the foregoing embodiment.

Modification Example 1-2

In the foregoing embodiment, twenty light-emitting sections BL are provided in the backlight 22; however, the embodiment is not limited thereto. Alternatively, for example, more than twenty light-emitting sections BL may be provided, or less than twenty light-emitting sections BL may be provided.

2. Second Embodiment

Next, description is given of a display apparatus according to a second embodiment. In the present embodiment, a light emission intensity is set for each light-emitting device 29. It is to be noted that substantially same components as those in the display apparatus 1 according to the foregoing first embodiment are denoted with same reference numerals, and description thereof is omitted as appropriate.

FIG. 15 illustrates a configuration example of the display apparatus 2 according to the present embodiment. The display apparatus 2 includes a luminance map generator 16, a corrector 17, and a backlight system 30. The backlight system 30 includes a backlight controller 31 and a backlight 34.

The backlight 34 emits light toward the light crystal display section 15 on the basis of a control signal supplied from the backlight controller 31, as with the backlight 22 according to the foregoing first embodiment.

FIG. 16 illustrates a configuration example of the backlight 34. The backlight 34 includes a plurality of light-emitting devices 29 arranged side by side in a matrix. In this example, 300 (=20×15) light-emitting devices 29 are arranged side by side. The light-emitting devices 29 are allowed to individually emit light for each of the light-emitting devices 29. It is to be noted that each of the light-emitting devices 29 may be configured with use of one light-emitting device or may be configured with use of a plurality of light-emitting devices.

The luminance map generator 16 generates a luminance map IMAP on the basis of image data of each frame image included in the image signal Sp13.

FIG. 16 illustrates an example of the luminance map IMAP. The luminance map generator 16 divides one frame image into 300 (=20×15) regions R, and generates luminance information I in the regions R on the basis of a plurality of pieces of pixel information P1 belonging to the respective regions R in the frame image. These 300 regions R respectively correspond to 300 light-emitting devices 29 in the backlight 34. Thereafter, the luminance map generator 16 outputs luminance information I in the 300 regions R as the luminance map IMAP.

The corrector 17 performs correction on the pixel information P1 included in the image signal Sp13 on the basis of the luminance map IMAP to generate an image signal Sp17. Specifically, the corrector 17 generates luminance information P2 through dividing the pixel information P1 included in the image signal Sp13 by the luminance information I corresponding to the pixel information P1 included in the luminance map IMAP. The corrector 17 determines the luminance information P2 corresponding to each of the pixel information P1 included in the image signal Sp13 in such a manner Thereafter, the corrector 17 outputs the determined luminance information P2 as the image signal Sp17.

The backlight controller 31 controls a light emission operation of the backlight 34 on the basis of the backlight synchronization signal SBL and the luminance map IMAP. The backlight controller 31 sets fifteen sub-frame periods PS (sub-frame periods PS1 to PS15) corresponding to each frame period PF, as with the backlight controller 21 according to the foregoing first embodiment. Thereafter, the backlight controller 31 individually sets the light emission intensities of the respective light-emitting devices 29 in each of the sub-frame periods PS. The backlight controller 31 includes a light emission distribution information generator 32 and a light emission intensity map generator 33.

The light emission distribution information generator 32 generates light emission distribution information INF in each of the subs-frame periods PS.

FIG. 18 schematically illustrates the light emission distribution information INF. The light emission distribution information generator 32 generates five pieces of light emission distribution information INF (light emission distribution information INF1 to INF15). The light emission distribution information INF1 to INF15 respectively correspond to the sub-frame period PS1 to PS15. The light emission distribution information INF each includes fifteen pieces of intensity information A (intensity information A1 to A15). The number (fifteen) of pieces of intensity information A corresponds to the number (fifteen) of light-emitting devices 29 in a vertical direction in the backlight 34 (FIG. 16). A white portion indicates a high light emission intensity, and a black portion indicates a low light emission intensity. The light emission distribution information generator 32 generates the light emission distribution information INF1 to INF15 so as to cause the light-emitting devices 29 to sequentially emit light from an uppermost section to a lowermost section in the backlight 34 in the sub-frame periods PS1 to P515, as with the foregoing first embodiment.

The light emission intensity map generator 33 generates light emission intensity maps LMAP (light emission intensity maps LMAP1 to LMAP15) indicating light emission intensities of the respective light-emitting devices 29 in the backlight 34 on the basis of the light emission distribution information INF1 to INF15 and the luminance map IMAP. Specifically, the light emission intensity map generator 33 performs a multiplication operation on the basis of, for example, one luminance map IMAP and fifteen pieces of light emission distribution information INF1 to INF15 to generate fifteen light emission intensity maps LMAP1 to LMAP15.

Thus, the backlight controller 31 generates the light emission intensity maps LMAP1 to LMAP15 on the basis of the backlight synchronization signal SBL and the luminance map IMAP. Thereafter, the backlight controller 31 controls the light emission operation of the respective light-emitting devices 29 in the sub-frame periods PS1 to PS15 on the basis of the light emission intensity maps LMAP1 to LMAP15.

Here, the luminance map generator 16 corresponds to a specific example of a "map generator" in the present disclosure. The liquid crystal display section 15 corresponds to a specific example of a "display section" in the present disclosure. The backlight controller 31 corresponds to a specific example of a "controller" in the present disclosure.

FIGS. 19A to 19C illustrate an operation of generating the light emission intensity map LMAP8 corresponding to the sub-frame period PS8. FIG. 19A illustrates the luminance map IMAP, FIG. 19B illustrates the light emission distribution information INF8, and FIG. 19C illustrates the light emission intensity map LMAP.

First, the luminance map generator 16 generates the luminance map IMAP on the basis of image data of one frame image included in the image signal Sp13 (FIG. 19A). The luminance map IMAP includes 300 (=20×15) pieces of luminance information I.

Moreover, the light emission distribution information generator 32 generates the light emission distribution information INF8 (FIG. 19B). In this example, the intensity information A8 located at a center in the upward-downward direction is set to, for example, "100" (a high light emission intensity), the intensity information A7 and A9 located above and below the intensity information A8 are set to, for example, "75", the intensity information A6 and A10 are set to, for example, "50", the intensity information A5 and A11 are set to, for example, "25", and the intensity information A1 to A4 and A12 to A15 are set to, for example, "0".

Thereafter, the light emission intensity map generator 33 performs a multiplication operation on the basis of the luminance map IMAP and the light emission distribution information INF8 to generate the light emission intensity map LMAP8 (FIG. 19C). Specifically, the light emission intensity map generator 33 multiplies respective twenty pieces of luminance information I in a first row in the luminance map IMAP (FIG. 19A) by the intensity information A1 in the light emission distribution information INF8 (FIG. 19B) to determine twenty pieces of light emission intensity information in a first row in the light emission intensity map LMAP8. Moreover, the light emission intensity map generator 33 multiplies respective twenty pieces of luminance information I in a second row in the luminance map IMAP by the intensity information A2 in the light emission distribution information INF8 to generate twenty pieces of light emission intensity information in a second row in the light emission intensity map LMAP8. Light emission intensity information in other rows is determined in a similar manner. The light emission intensity map generator 33 generates the light emission intensity map LMAP8 in such a manner.

Thereafter, the backlight controller 31 controls the light emission operation of the respective light-emitting devices 29 in the sub-frame period PS8 on the basis of the light emission intensity map LMAP8.

As described above, in the display apparatus 2, the multiplication operation is performed on the basis of the luminance map IMAP and the light emission distribution information INF1 to INF15 to generate the light emission intensity maps LMAP1 to LMAP15, which makes it possible to enhance image quality and to reduce power consumption.

Moreover, in the display apparatus 2, the light emission distribution information INF1 to INF15 are generated, as illustrated in FIG. 18. Accordingly, for example, in a case where the liquid crystal display section 15 displays a uniform image, the light emission intensities of the respective light-emitting devices 29 are gradually changed in the scanning direction in each of the sub-frame periods PS, which makes it possible to enhance image quality, as with the case of the foregoing first embodiment.

As described above, in the present embodiment, the multiplication operation is performed on the basis of the luminance map and the light emission distribution information to generate the light emission intensity map, which makes it possible to enhance image quality and to reduce power consumption. Other effects are similar to those in the foregoing first embodiment.

Modification Example 2-1

In the foregoing embodiment, the light-emitting devices 29 that emit light in the sub-frame period PS1 continuously emit light throughout the sub-frame period PS1; however, the embodiment is not limited thereto. Alternatively, for example, the light-emitting devices 29 may emit light at a light emission duty ratio corresponding to the light emission intensity information in the light emission intensity map LMAP. Even with such a configuration, it is possible to individually set average light emission intensities of the respective light-emitting devices 29 in each of the sub-frame periods PS, which makes it possible to achieve effects similar to those in the foregoing embodiment.

Modification Example 2-2

In the foregoing embodiment, 300 (=20×15) light-emitting devices 29 are provided in the backlight 34; however, the embodiment is not limited thereto. Alternatively, more than 300 light-emitting devices 29 may be provided, or less than 300 light-emitting devices 29 may be provided.

3. Application Examples

In the following, description is given of an application example of the display apparatuses described in the foregoing embodiments and modification examples.

FIG. 20 illustrates an external appearance of a television to which any of the display apparatuses according to the foregoing embodiments, etc. is applied. This television includes, for example, an image display screen section 510 including a front panel 511 and a filter glass 512. The image display screen section 510 includes any of the display apparatuses according to the foregoing embodiments, etc.

The display apparatuses according to the foregoing embodiments, etc. are applicable to electronic apparatuses in any fields, such as a digital camera, a notebook personal computer, a mobile terminal device such as a mobile phone, a portable game machine, and a video camera in addition to such a television. In other words, the display apparatuses according to the foregoing embodiments, etc. are applicable to electronic apparatuses in any fields that display a picture. The present technology makes it possible to reduce a possibility that image quality of an image to be displayed on an electronic apparatus is deteriorated, which is effective specifically in an electronic apparatus having a large display screen.

Although the present technology has been described with reference to some embodiments, the modification examples thereof, and application examples to the electronic apparatuses, the present technology is not limited to these embodiments, etc., and may be modified in a variety of ways.

For example, in the foregoing respective embodiments, the frame rate converter 12 doubles the frame rate from 60 [fps] to 120 [fps]; however, the embodiments are not limited thereto. Alternatively, for example, the frame rate converter 12 may quadruple the frame rate from 60 [fps] to 240 [fps]. Moreover, the frame rate of the image signal to be inputted is 60 [fps]; however, the frame rate is not limited thereto. Alternatively, the frame rate of the image signal to be inputted may be 50 [fps], for example.

Moreover, for example, in the foregoing respective embodiments, frame rate conversion is performed; however, the embodiments are not limited thereto, and the frame rate conversion may not be performed.

It is to be noted that the effects described in the description are merely illustrative and non-limiting, and other effects may be included.

It is to be noted that the present technology may have the following configurations.

(1) A backlight unit, including:

a backlight including a plurality of light-emitting devices that are allowed to emit light at mutually different timings and include a first light-emitting device and a second light-emitting device; and a controller that controls a light emission operation of the backlight to cause the first light-emitting device and the second light-emitting device to emit light with mutually different average light emission intensities in a first sub-frame period of a plurality of sub-frame periods provided corresponding to a frame period.

(2) The backlight unit according to (1), in which the plurality of light-emitting devices are arranged side by side in a first direction, and the controller performs control to cause a predetermined number of successive light-emitting devices including the first light-emitting device and the second light emitting device out of the plurality of light-emitting devices to emit light in the first sub-frame period.

(3) The backlight unit according to (2), in which the predetermined number is 3 or more, and the controller performs control to cause an average light emission intensity of a light-emitting device disposed at an end in the first direction out of the predetermined number of light-emitting devices to be lower than an average light emission intensity of a light-emitting device disposed around a center in the first direction.

(4) The backlight unit according to (2) or (3), in which the controller controls a light emission operation of the backlight by scanning in the first direction in each frame period.

(5) The backlight unit according to any one of (2) to (4), in which a display section that modulates light emitted from the backlight displays a frame image by line-sequential scanning, and the first direction is a scanning direction of the line-sequential scanning.

(6) The backlight unit according to (5), in which each of the light-emitting devices includes a plurality of light-emitting devices arranged side by side in a second direction intersecting with the first direction.

(7) The backlight unit according to any one of (1) to (6), in which the first light-emitting device emits light with a first light emission intensity throughout the first sub-frame period, and the second light-emitting device emits light with a second light emission intensity different from the first light emission intensity throughout the first sub-frame period.

(8) The backlight unit according to any one of (1) to (6), in which the first light-emitting device emits light at a first light emission duty ratio in the first sub-frame period, and the second light-emitting device emits light at a second light emission duty ratio different from the first light emission duty ratio in the first sub-frame period.

(9) The backlight unit according to any one of (1) to (8), in which the first light-emitting device emits light also in a second sub-frame period, and the average light emission intensity of the first light-emitting device in the first sub-frame period is different from the average light emission intensity of the first light-emitting device in the second sub-frame period.

(10) The backlight unit according to any one of (1) to (9), in which the plurality of light-emitting devices are arranged side by side in a first direction, the backlight unit further includes a diffuser plate that diffuses light emitted from the plurality of light-emitting devices, and a gradient in a distribution of light outputted from the diffuse plate in the first sub-frame period is equal to or lower than a maximum gradient in a sine-wave grating having a spatial frequency of 0.27 [cycles/deg.].

(11) A display apparatus, including:

a display section; and a backlight unit, in which the backlight unit includes a backlight including a plurality of light-emitting devices that are allowed to emit light at mutually different timings and include a first light-emitting device and a second light-emitting device, and a controller that controls a light emission operation of the backlight to cause the first light-emitting device and the second light-emitting device to emit light with mutually different average light emission intensities in a first sub-frame period of a plurality of sub-frame periods provided corresponding to a frame period.

(12) A display apparatus, including:

a map generator that generates a luminance map on the basis of image data of a frame image;

a display section that displays the frame image by scanning in a first direction;

a backlight that includes a plurality of light-emitting devices arranged side by side in the first direction and a second direction intersecting with the first direction, and performs a light emission operation by scanning in the first direction; and a controller that generates light emission distribution information in the first direction in each of a plurality of sub-frame periods provided corresponding to a frame period, and controls the light emission operation of the backlight on the basis of the luminance map and the light emission distribution information.

(13) The display apparatus according to (12), in which the light emission distribution information in a first sub-frame period of the plurality of sub-frame periods includes first average intensity information and second average intensity information that correspond to positions different from each other in the first direction, and have mutually different values other than zero.

(14) The display apparatus according to (13), in which the light emission distribution information in the first sub-frame period includes the first average intensity information and the second average intensity information, and includes a predetermined number of pieces of successive average intensity information in the first direction that each have a value other than zero.

(15) The display apparatus according to (14), in which the predetermined number is 3 or more, and a value indicated by average intensity information disposed at an end in the first direction of the predetermined number of pieces of average intensity information is lower than a value indicated by average intensity information disposed around a center in the first direction.

(16) A light emission control method, including:

setting a plurality of sub-frame periods corresponding to a frame period; and controlling a light emission operation of a backlight to cause a first light-emitting device and a second light-emitting device in the backlight to emit light with average light emission intensity different from each other in a first sub-frame period of the plurality of sub-frame periods.

It should be understood by those skilled in the art that various modifications, combinations, sub-combinations and alterations may occur depending on design requirements and other factors insofar as they are within the scope of the appended claims or the equivalents thereof.

The invention claimed is:

1. A backlight unit, comprising:

a backlight including a plurality of light-emitting sections, the light-emitting sections being operable to emit light at mutually different timings and including a first light-emitting section and a second light-emitting section; and a controller that controls a light emission operation of the backlight to cause the first light-emitting section and the second-light emitting section to emit light with mutually different light emission intensities in a first sub-frame period of a plurality of sub-frame periods corresponding to a frame period, wherein, the backlight unit comprises a diffuser plate that diffuses light emitted from the plurality of light-emitting sections to output diffused light, and wherein a gradient in a characteristic of the diffused light output from the diffuser plate, as determined by fitting a portion of the characteristic to a sinusoidal waveform, is equal to or lower than a maximum gradient in a sine-wave grating having a spatial frequency based on a resolution of images displayed on a screen of a display apparatus and a distance from the screen.

2. The backlight unit according to claim 1, wherein the light-emitting sections are arranged side by side in a first direction.

3. The backlight unit according to claim 2, wherein the controller controls light emission of the plurality of light-emitting sections such that, within a sub-frame period, light intensities of a predetermined number of selected successive light-emitting sections progressively increase from a first value to a maximum value and progressively decrease to the first value in a scanning direction in the sub-frame period.

4. The backlight unit according to claim 3, wherein the predetermined number is three or more, and the controller performs control to cause a light emission intensity of a light-emitting section disposed at an end in the first direction out of the predetermined number of selected light-emitting sections to be lower than an average light emission intensity of a light-emitting section disposed around a center in the first direction.

5. The backlight unit according to claim 2, wherein the controller controls the light emission operation of the backlight by scanning in the first direction in the frame period.

6. The backlight unit according to claim 2, wherein a display section that modulates light emitted from the backlight displays a frame image by line-sequential scanning, and the first direction is a scanning direction of the line-sequential scanning.

7. The backlight unit according to claim 6, wherein each of the light-emitting sections includes a plurality of light-emitting devices arranged side by side in a second direction intersecting with the first direction.

8. The backlight unit according to claim 1, wherein the first light-emitting section emits light with a first light emission intensity throughout the first sub-frame period, and the second light-emitting section emits light with a second light emission intensity different from the first light emission intensity throughout the first sub-frame period.

9. The backlight unit according to claim 1, wherein the first light-emitting section emits light at a first light emission duty ratio in the first sub-frame period, and the second light-emitting section emits light at a second light emission duty ratio different from the first light emission duty ratio in the first sub-frame period.

10. The backlight unit according to claim 1, wherein the first light-emitting section emits light also in a second sub-frame period, and the average light emission intensity of the first light-emitting section in the first sub-frame period is different from the average light emission intensity of the first light-emitting section in the second sub-frame period.

11. A display apparatus, comprising:

a display section;

a backlight including a plurality of light-emitting sections, the light-emitting sections being operable to emit light at mutually different timings and including a first light-emitting section and a second light-emitting section; and a controller that controls a light emission operation of the backlight to cause the first light-emitting section and the second light-emitting section to emit light with mutually different light emission intensities in a first sub-frame period of a plurality of sub-frame periods corresponding to a frame period, wherein, the backlight unit comprises a diffuser plate that diffuses light emitted from the plurality of light-emitting sections to output diffused light, and a gradient in a characteristic of the diffused light output from the diffuser plate as determined by fitting a portion of the characteristic to a sinusoidal waveform, is equal to or lower than a maximum gradient in a sine-wave grating having a spatial frequency based on a resolution of images displayed on a screen of the display apparatus and a distance from the screen.

12. The display apparatus according to claim 11, further comprising a map generator that generates a luminance map on the basis of image data of a frame image; and wherein the display section displays the frame image by scanning in a first direction, the light-emitting sections are arranged side by side in the first direction, each of the light-emitting sections includes a plurality of light-emitting devices arranged side by side in a second direction intersecting with the first direction, and the backlight performs a light emission operation by scanning in the first direction, and the controller generates light emission distribution information in the first direction in each of the sub-frame periods, and controls the light emission operation of the backlight on the basis of the luminance map and the light emission distribution information.

* * * * *